US012308529B2

(12) United States Patent
Yang

(10) Patent No.: US 12,308,529 B2
(45) Date of Patent: May 20, 2025

(54) ELECTRONIC DEVICE

(71) Applicant: GUANGDONG OPPO MOBILE TELECOMMUNICATIONS CORP., LTD., Guangdong (CN)

(72) Inventor: Dongxu Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 299 days.

(21) Appl. No.: 18/057,975

(22) Filed: Nov. 22, 2022

(65) Prior Publication Data

US 2023/0093645 A1 Mar. 23, 2023

Related U.S. Application Data

(63) Continuation of application No. PCT/CN2021/084402, filed on Mar. 31, 2021.

(30) Foreign Application Priority Data

May 25, 2020 (CN) ......................... 202010453114.7
May 25, 2020 (CN) ......................... 202020899759.9

(51) Int. Cl.
*H01Q 1/24* (2006.01)
*H01Q 21/30* (2006.01)

(52) U.S. Cl.
CPC ............. *H01Q 21/30* (2013.01); *H01Q 1/241* (2013.01)

(58) Field of Classification Search
CPC .......... H01Q 1/24; H01Q 1/241; H01Q 1/243; H01Q 21/28; H01Q 21/30; H01Q 9/42; H01Q 5/328; H01Q 5/335
See application file for complete search history.

(56) References Cited

U.S. PATENT DOCUMENTS 10,741,904 B2 * 8/2020 Kim ....................... H01Q 5/307
10,879,589 B2 * 12/2020 Lim .................... H04M 1/0268
(Continued)

FOREIGN PATENT DOCUMENTS

CN 105789881 7/2016
CN 109004343 12/2018
(Continued)

OTHER PUBLICATIONS

EPO, Extended European Search Report for EP Application No. 21812854.4, Sep. 28, 2023.
(Continued)

*Primary Examiner* — Thai Pham
(74) *Attorney, Agent, or Firm* — Hodgson Russ LLP

(57) ABSTRACT

An electronic device is provided, which includes a metal frame and multiple radio-frequency sources. The metal is divided into multiple separate frame segments by multiple gaps, and the multiple frame segments are served as antenna bodies and support frequency bands of multiple communication standards. Among the multiple frame segments, at least three frame segments support a 5G band, among the at least three frame segments each supporting the 5G band, at least one frame segment further supports a LMHB of LTE, and among frame segments other than the at least three frame segments each supporting the 5G band, at least one frame segment supports the LMHB of the LTE. The at least one frame segment supporting the LMHB of the LTE among the frame segments other than the at least three frame segments and the at least three frame segments are configured for implementing a 5G NSA communication standard.

19 Claims, 10 Drawing Sheets

(56) References Cited

U.S. PATENT DOCUMENTS

| | | | | |
|---|---|---|---|---|
| 2014/0266938 | A1 | 9/2014 | Ouyang et al. | |
| 2017/0117614 | A1* | 4/2017 | Wu | H01Q 9/42 |
| 2018/0090847 | A1 | 3/2018 | Romano et al. | |
| 2019/0312333 | A1 | 10/2019 | Kim et al. | |
| 2020/0044364 | A1* | 2/2020 | Zhu | H01Q 1/243 |
| 2020/0106164 | A1* | 4/2020 | Wang | H01Q 1/243 |
| 2020/0106177 | A1* | 4/2020 | Zhou | H01Q 5/378 |
| 2020/0350660 | A1 | 11/2020 | Kim et al. | |
| 2020/0411957 | A1* | 12/2020 | Zhu | H01Q 5/307 |
| 2021/0126349 | A1* | 4/2021 | Zhou | H01Q 1/36 |
| 2021/0135351 | A1 | 5/2021 | Son et al. | |
| 2023/0099917 | A1* | 3/2023 | Liu | H01Q 21/28<br>343/702 |

FOREIGN PATENT DOCUMENTS

| | | | | |
|---|---|---|---|---|
| CN | 109066066 | | 12/2018 | |
| CN | 208433511 | | 1/2019 | |
| CN | 208433511 U | | 1/2019 | |
| CN | 208433519 | | 1/2019 | |
| CN | 208539094 | | 2/2019 | |
| CN | 208539096 | | 2/2019 | |
| CN | 208539096 U | * | 2/2019 | |
| CN | 209072551 | | 7/2019 | |
| CN | 209072551 U | | 7/2019 | |
| CN | 110351404 | | 10/2019 | |
| CN | 110351404 A | * | 10/2019 | H01Q 1/242 |
| CN | 110571514 | | 12/2019 | |
| CN | 209860131 | | 12/2019 | |
| CN | 209929481 | | 1/2020 | |
| CN | 209929481 U | | 1/2020 | |
| CN | 110875512 | | 3/2020 | |
| CN | 110994156 | | 4/2020 | |
| CN | 110994156 A | | 4/2020 | |
| CN | 211957929 | | 11/2020 | |
| CN | 211957929 U | | 11/2020 | |
| KR | 20180122231 | | 11/2018 | |

OTHER PUBLICATIONS

WIPO, International Search Report and Written Opinion for International Application No. PCT/CN2021/084402, Jun. 18, 2021.

Chen, "4G/5G Multiband MIMO Antennas for Metallic Frame Mobile Terminal Application," Master's Degree Thesis for Xidian University, Feb. 15, 2020.

CNIPA, First Office Action for CN Application No. 202010453114.7, Aug. 8, 2024.

CNIPA, First Office Action for CN Application No. 202010453115.1, Aug. 16, 2024.

USPTO, Office Action for U.S. Appl. No. 18/058,449, filed Aug. 1, 2024.

World 5G Communications Frequency Bands and Operation Modes, 2018.

EPO, Extended European Search Report for EP Application No. 21812420.4, Nov. 3, 2023.

International Searching Authority, Written Opinion for PCT Application No. PCT/CN2021/084046, dated Jun. 24, 2021.

WIPO, International Search Report and Written Opinion for corresponding International Application No. PCT/CN2021/084046, Jun. 24, 2021.

EPO, Extended European Search Report issued in corresponding European Application No. 21812420.4, Nov. 3, 2023.

Anritsu, "World 5G Communications Frequency Bands and Operation Modes," 2018.

USPTO, Non-final OA issued in corresponding U.S. Appl. No. 18/058,449, filed Aug. 1, 2024.

CNIPA, First Office Action issued in corresponding CN Application No. 202010453115.1, Aug. 16, 2024.

* cited by examiner

ELECTRONIC DEVICE

CROSS-REFERENCE TO RELATED APPLICATIONS

This application is a continuation of International Application No. PCT/CN2021/084402, filed Mar. 31, 2021, which claims priority to Chinese Patent Application No. 202020899759.9, filed May 25, 2020, and priority to Chinese Patent Application No. 202010453114.7, filed May 25, 2020, the entire disclosures of which are incorporated herein by reference.

TECHNICAL FIELD

The disclosure relates to mobile communication technologies, in particular to an electronic device.

BACKGROUND

At present, with popularity of full screens and curved screens, less clearance zone is left for antennas. However, due to the increase of a fifth-generation (5G) band and other frequency bands, there are more antennas than that of fourth-generation (4G) long-term evolution (LTE), which leads to difficulties in antenna layout and lower efficiency. At present, a metal-framed antenna is usually adopted to solve problems of more antenna and less clearance zone. However, the current design of the metal-framed antenna is unreasonable. For example, the number of antennas that can be made on an existing middle frame is limited, and other antennas need to be arranged inside a device. However, arranging antennas inside the device affects antenna performance and increases cost.

SUMMARY

An electronic device is provided, which includes a metal frame and multiple radio-frequency sources. The metal frame is divided into multiple separate frame segments by multiple gaps, the multiple frame segments are severed as antenna bodies and support frequency bands of multiple communication standards. Among the multiple frame segments, at least three frame segments support a fifth-generation (5G) band, among the at least three frame segments each supporting the 5G band, at least one frame segment further supports a low-middle-high band (LMHB) of long-term evolution (LTE), and among frame segments other than the at least three frame segments each supporting the 5G band, at least one frame segment supports the LMHB of the LTE. The at least one frame segment supporting the LMHB of the LTE among the frame segments other than the at least three frame segments each supporting the 5G band and the at least three frame segments each supporting the 5G band are configured for implementing a 5G non-standalone (NSA) communication standard. The at least one frame segment supporting the LMHB of the LTE among the frame segments other than the at least three frame segments each supporting the 5G band, and the frame segment supporting the LMHB of the LTE among the at least three frame segments each supporting the 5G band are located at different sides of the metal frame.

An electronic device is provided, an electronic device includes a metal frame is divided into multiple separate frame segments by a plurality of gaps, and the multiple frame segments severe as antenna bodies and support frequency bands of multiple communication standards. The antenna bodies at least include a first antenna body, a second antenna body, a third antenna body, and a fourth antenna body. The first antenna body supports a LMHB of LTE. The second antenna body, the third antenna body, and the fourth antenna body each support a fifth-generation (5G) band, and the second antenna body further supports the LMHB of the LTE. The first antenna body and at least one of the second antenna body, the third antenna body, and the fourth antenna body are configured for implementing a 5G NSA communication standard. The first antenna body and the second antenna body are located at different sides of the metal frame.

BRIEF DESCRIPTION OF THE DRAWINGS

In order to explain technical schemes in implementations of the present disclosure more clearly, the following briefly introduces accompanying drawings required for describing the implementations. Obviously, the accompanying drawings in the following description illustrate some implementations of the present disclosure. Those of ordinary skill in the art may also obtain other drawings based on these accompanying drawings without creative efforts.

DETAILED DESCRIPTION

Technical solutions in implementations of the application will be described clearly and completely in the following in combination with accompanying drawings in the implementations of the disclosure. Obviously, the described implementations are only part rather than all of the implementations of this disclosure. On a basis of the implementations in this disclosure, all other implementations obtained by those of ordinary skill in the art without creative efforts should fall within a protection scope of this disclosure.

In description of the implementation of this disclosure, it should be understood that an orientation or a positional relationship indicated by a term such as “thickness” is based on an orientation or a positional relationship illustrated in the accompanying drawings, only for convenience and simplification of description of this disclosure, and does not imply or indicate that a referred device or component must have a specific orientation, be constructed and operated in a specific orientation, and it cannot be understood as any limitation on this disclosure.

Figure 1:
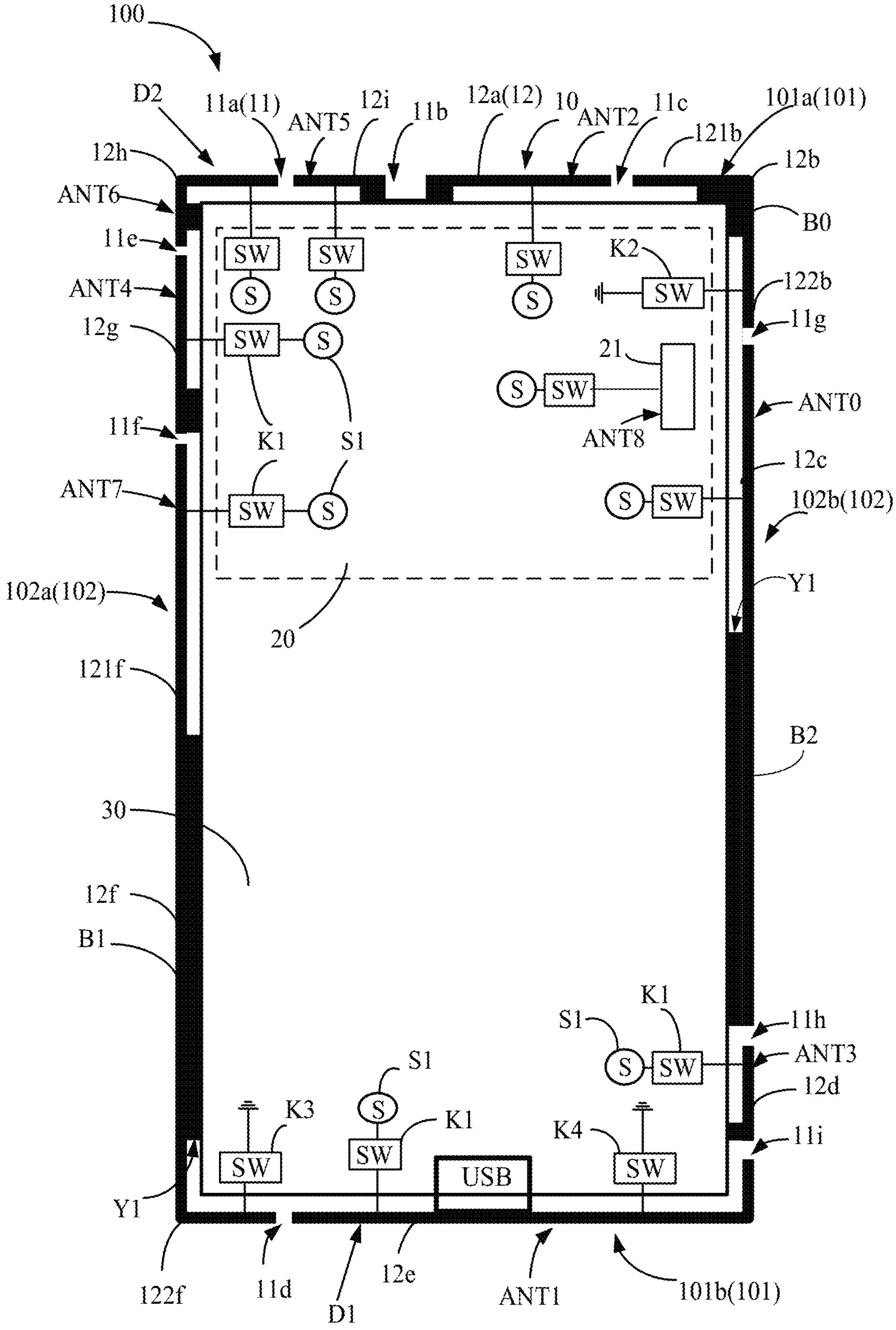
FIG. 1 is a schematic plan view of an electronic device in an implementation of the present disclosure and illustrates part of an internal structure.

Reference is made to FIG. 1, which is a schematic plan view of an electronic device 100 in an implementation of the present disclosure and illustrates part of an internal structure. As illustrated in FIG. 1, the electronic device 100 includes a metal frame 10 and multiple radio-frequency sources S1. The metal frame 10 defines multiple gaps 11, the metal frame 10 is divided into multiple separate frame segments 11 by the multiple gaps 12, the multiple frame segments 12 are severed as antenna bodies and support frequency bands of multiple communication standards. Among the multiple frame segments, at least three frame segments support a fifth-generation (5G) band; among the at least three frame segments each supporting the 5G band, at least one frame segment further supports a low-middle-high band (LMHB) of long-term evolution (LTE); and among frame segments other than the at least three frame segments each supporting the 5G band, at least one frame segment supports the LMHB of the LTE. The at least one frame segment supporting the LMHB of the LTE among the frame segments other than the at least three frame segments each supporting the 5G band and the at least three frame segments each supporting the 5G band are configured for implementing a 5G non-standalone (NSA) communication standard. The at least one frame segment supporting the LMHB of the LTE among the frame segments other than the at least three frame segments each supporting the 5G band, and the frame segment supporting the LMHB of the LTE among the at least three frame segments each supporting the 5G band are located at different sides of the metal frame.

In this disclosure, with the at least one frame segment further supporting the LMHB of the LTE, and the at least one frame segment supporting the LMHB of the LTE among the frame segments other than the at least three frame segments each supporting the 5G band and the at least three frame segments each supporting the 5G band being configured for implementing the 5G NSA communication standard, the number of antenna bodies can be reduced, and the 5G NSA communication standard is mainly realized through the metal frame, thereby improving antenna performance and reducing cost. In addition, the at least one frame segment supporting the LMHB of the LTE among the frame segments other than the at least three frame segments each supporting the 5G band, and the frame segment supporting the LMHB of the LTE among the at least three frame segments each supporting the 5G band are located at different sides of the metal frame, thus ensuring antenna performance in different holding standards.

Frequency bands of communication standards supported by the multiple frame segments 12 include frequency bands of communication standards such as 5G NSA, 5G standalone (SA), Wi-Fi, global positioning system (GPS), and 2nd/3rd/4th generation communication technology (2/3/4G).

The at least three frame segments support the 5G band, which means that the at least three frame segments support a frequency band of the 5G NSA and/or 5G SA communication standard. The LMHB of the LTE refers to low, middle, and high bands of a 4G LTE communication standard.

Some of the multiple frame segments 12 are each connected with a radio-frequency source S1, and at least one frame segment 12 of the multiple frame segments 12 is not connected with any radio-frequency source S1.

In this disclosure, multiple frame segments of the metal frame 10 are served as antenna bodies to support frequency bands of multiple communication standards, including 5G NSA, 5G SA, Wi-Fi, GPS, 2/3/4G, etc., so as to meet communication requirements, and reduce the number of antennas inside the device as much as possible. In addition, some of the frame segments 12 are each connected with the radio-frequency source S1, and at least one frame segment 12 is not connected with any radio-frequency source S1. The frame segment 12, which is not connected with any radio-frequency source S1, is coupled with an adjacent frame segment 12 connected with the radio-frequency source S1, and is served as a reinforced antenna body or a parasitic antenna body of an antenna body formed by the frame segment connected with the radio-frequency source. As such, the number of radio-frequency sources can be reduced, and the antenna performance or increase frequency bands of the antenna can be improved.

The frame segment 12 which is not connected with any radio-frequency source S1 is grounded, and the frame segment 12 which is not connected with any radio-frequency source S1 is coupled with the adjacent frame segment 12 connected with the radio-frequency source S1 and is served as the reinforced antenna body or the parasitic antenna body of the antenna body formed by the frame segment connected with the radio-frequency source.

As illustrated in FIG. 1, the electronic device further includes multiple radio-frequency sources S1. At least some of the frame segments 12 are each connected with the radio-frequency source S1, and the radio-frequency sources S1 are configured for providing feed signals to the at least some of the frame segments, and can excite corresponding frame segments 12 to operate, so as to realize transmission and reception of radio-frequency signals in various frequency bands of the multiple communication standards described above.

Different radio-frequency sources S1 are configured to directly or indirectly excite corresponding frame segments 12 to operate, so that respective frame segments 12 operate in the corresponding frequency bands of corresponding communication standards. As described above, a certain radio-frequency source S1 can only be configured to directly excite a frame segment 12 directly connected to make the frame segment 12 operate, to realize transmission and reception of radio-frequency signals in a corresponding frequency band of a corresponding communication standard. For example, another radio-frequency source S1 can be configured to directly excite a frame segment 12 directly connected, or to indirectly excite a frame segment adjacent to the frame segment 12 directly connected through coupling feed excitation, so that the frame segment 12 directly connected and the adjacent frame segment cooperate with each other to realize transmission and reception of radio-frequency signals in a corresponding frequency band of a corresponding communication standard.

Since the frame segment 12, which is not connected with any radio-frequency source S1, is coupled with the adjacent frame segment 12 connected with the radio-frequency source S1 and is served as the reinforced antenna body or the parasitic antenna body of the antenna body formed by the frame segment connected with the radio-frequency source, the antenna performance can be can effectively be improved or the frequency bands of the antenna can be increased.

In this disclosure, the wording "connected" can be connected directly or connected indirectly. For example, "A is connected with B" includes A is connected with B directly and A is connected with B indirectly through C.

Figure 8:
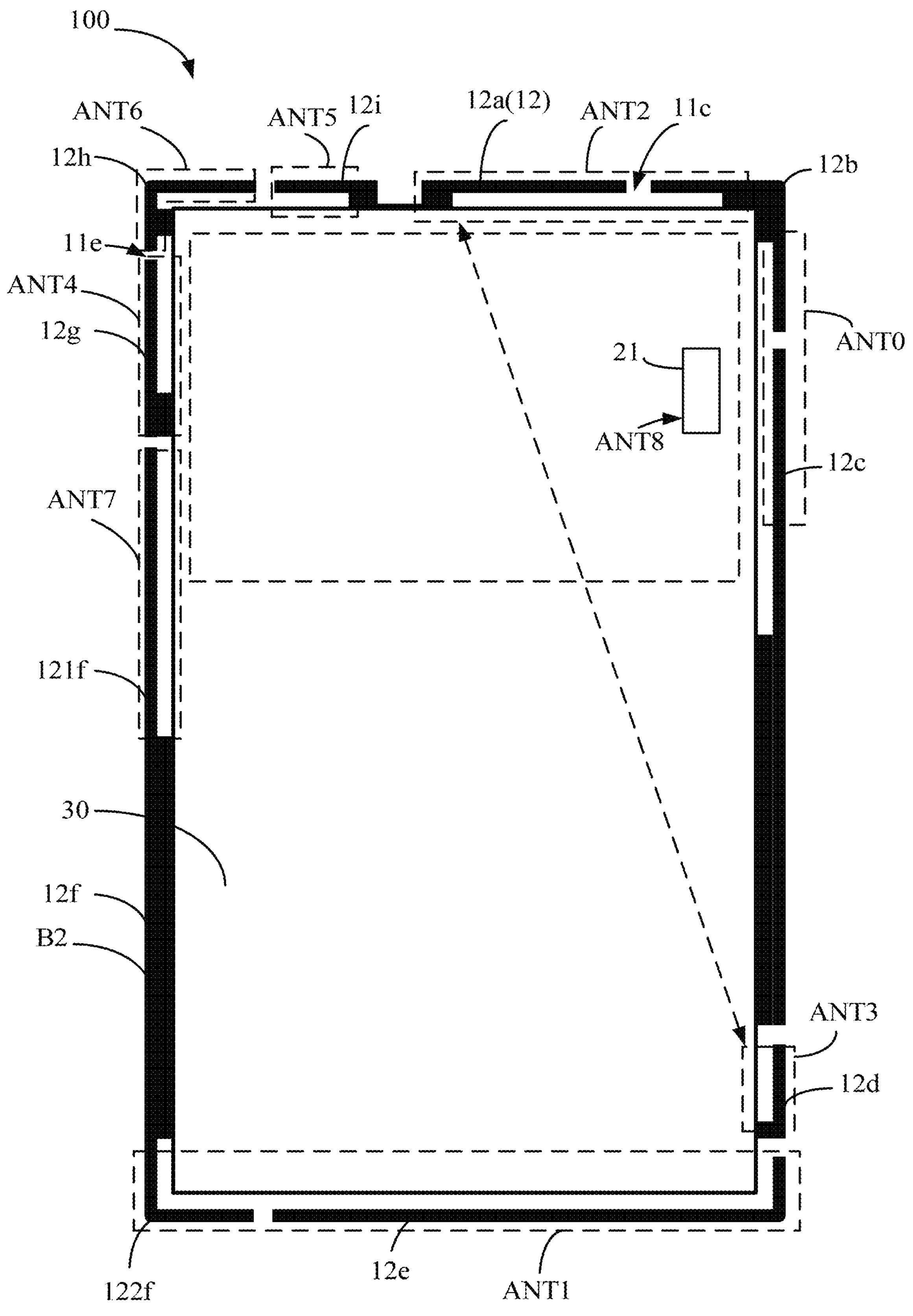
FIG. 8 is a schematic diagram illustrating switching among antenna bodies supporting a band N41 in an electronic device in an implementation of the present disclosure.

An antenna apparatus 200 (as illustrated in FIG. 8) is formed at least by all of the frame segments 12 of the metal frame 10 and the multiple radio-frequency sources S1, that is, the antenna apparatus 200 at least includes all of the frame segments 12 of the metal frame 10 and the multiple radio-frequency sources S1.

As illustrated in FIG. 1, the electronic device 100 further includes a main board 20, and the antenna apparatus 200 further includes an antenna body 21 disposed on the main board 20, and the antenna body 21 cooperates with some of the frame segments 12 to support a frequency band of one of the communication standards.

In the antenna apparatus 200 of the present disclosure, besides the antenna body formed by the frame segments of the metal frame 10, only one antenna body 21 is required to be disposed on the main board 20, which can effectively improve the antenna performance compared with an existing scheme that requires multiple antenna bodies 21 to be disposed on the main board 20. The antenna body 21 disposed on the main board 20 supports a high frequency band. Because the high frequency band has strong penetration, radiation performance will not be greatly affected even if the antenna body 21 is disposed inside the electronic device 100.

The antenna body 21 can be a laser-direct-structuring (LDS) antenna formed on the antenna support of the main board 20 by laser technologies, that is, the antenna support is disposed on the main board 20, and then the LDS antenna is formed on the antenna support. The LDS antenna refers to a metal antenna pattern directly plated on the antenna support disposed on the main board 20 by laser technologies. In other implementations, the antenna body 21 may be a flexible printed circuit (FPC) antenna disposed on the main board 20. The FPC antenna refers to a metal antenna pattern formed on an FPC, and the FPC antenna can be fixed to the main board 20 by bonding, embedding, welding, etc.

In some implementations, at least one of the multiple frame segments 12 supports a frequency band of a certain communication standard independently, and at least some of the frame segments 12 at least cooperate with other frame segments to support a frequency band of a certain communication standard.

At least some of the frame segments 12 at least cooperating with other frame segments to support a frequency band of a certain communication standard includes: multiple frame segments 12 cooperatively support a frequency band of a certain communication standard, or the multiple frame segments 12 are cooperated with the antenna segments 21 on the main board 20 to support a frequency band of a certain communication standard.

As illustrated in FIG. 1, the antenna body 21 on the main board 20 is also connected with a radio-frequency source S1. The antenna body 21 operates under excitation of an excitation signal of the radio-frequency source S1, and cooperate with other corresponding frame segments 12 to realize transmission and reception of radio-frequency signals in a corresponding frequency band of a corresponding communication standard.

As illustrated in FIG. 1, in some implementations, at least one gap is defined at a part of the metal frame 10 at a bottom D1 of the electronic device 100. In other words, at least one gap is defined at a bottom part of the metal frame 10.

The bottom D1 of the electronic device 100 can be an end of a lower part when the electronic device 100 is placed upright. A camera is generally disposed at a top end D2 of the electronic device 100, and a connection interface such as a USB interface is generally located at the bottom D1, and the bottom D1 of the electronic device 100 can be an end where the connection interface such as the USB interface is located. In the present disclosure, the at least one gap 11 is defined at a side of the metal frame 10 where the USB interface is located.

Therefore, by defining the at least one gap at the part of the metal frame 10 at the bottom of the electronic device 100, the number of gaps at a left-bottom side and a right-bottom side of the electronic device 100 can be reduced, thereby reducing influence caused by user's holding during use.

As illustrated in FIG. 1, the electronic device 100 is substantially square, and the metal frame 10 is rectangular, including two opposite short sides 101 and two opposite long sides 102, and the two opposite short sides 101 and two opposite long sides 102 cooperatively form the metal frame 10. The part of the metal frame 10 at the bottom of the electronic device 100 can be one of the short sides 101 where the connection interface such as the USB interface is located.

The two short sides 101 include a first short-side 101*a* and a second short-side 101*b*, and the two long sides 102 include a first long-side 102*a* and a second long-side 102*b*. That is, the metal frame 10 includes the first short-side 101*a* and the second short-side 101*b* opposite to the first short-side 101*a*, as well as the first long-side 102*a* and the second long-side 102*b* opposite to the first long-side 102*a*. The first short-side 101*a* is at the top of the electronic device 100, the second short-side 101*b* is at the bottom of the electronic device 100, the first long-side 102*a* is at a left side of the electronic device 100, and the second long-side 102*b* is at a right side of the electronic device 100.

FIG. 1 is a schematic view of an electronic device 100 viewed from one side of a screen, and orientation terms "top", "bottom", "left", and "right" are all orientations from a perspective of FIG. 1.

The connection interface such as the USB interface is located in the second short-side 101*b*.

As illustrated in FIG. 1, in this implementation, the first short-side 101*a* defines three gaps 11*a*, 11*b*, and 11*c*, the second short-side 101*b* define one gap 11*d*, the first long-side 102*a* defines two gaps 11*e* and 11*f*, and the second long-side 102*b* defines three gaps 11*g*, 11*h*, and 11*i*.

That is, in this implementation, nine gaps 11 are defined in the metal frame 10, and the metal frame is divided into nine separate frame segments 12. In this disclosure, separate frame segments 12 means that adjacent frame segments 12 are fully isolated by the gaps 11.

The gap 11*a* defined in the first short-side 101*a* is close to the first long-side 102*a* and the gap 11*c* defined in the first short-side 101*a* is close to the second long-side 102*b*. The gap 11*b* is between the gap 11*a* and the gap 11*c* and close to the gap 11*a*. The two gaps 11*e* and 11*f* defined in the first long-side 102*a* are both close to the first short-side 101*a*, and the gap 11*e* is closer to the first short-side 101*a* than the gap 11*f*. The gap 11*d* defined in the second short-side 101*b* is close to the first long-side 102*a*, the gap 11g defined in the second long-side 102*b* is close to the first short-side 101*a*, the gaps 11*h* and 11*i* defined in the second long-side 102*b* are both close to the second short-side 101*b*, and the gap 11*i* is closer to the second short-side 101*b* than the gap 11*h*.

Therefore, two gaps 11*e* and 11*f* defined in the first long-side 102*a* and the gap 11*g* defined in the second long-side 102*b* of the metal frame 10 of the present disclosure are all close to the first short-side 101*a*, and thus no gap 11 is defined at a left-bottom side of the electronic device 100. When a user holds the electronic device 100 vertically, a holding position is usually at a side of and close to the bottom of the electronic device 100. Since no gap 11 is defined in the left-bottom side of the electronic device 100, influence caused by the user's holding on antenna radiation can be reduced. In this disclosure, holding the electronic device 100 vertically refers to holding the electronic device 100 while the electronic device 100 is in a portrait-standard display state, and correspondingly, holding the electronic device 100 horizontally refers to holding the electronic device 100 when while the electronic device 100 is in a landscape-standard display state.

Specifically, the nine frame segments 12 include a first frame segment 12*a* between gaps 11*b* and 11*c*, a second frame segment 12*b* between gaps 11*c* and 11*g*, a third frame segment 12*c* between gaps 11*g* and 11*h*, a fourth frame segment 12*d* between gaps 11*h* and 11*i*, a fifth frame segment 12*e* between gaps 11*i* and 11*d*, a sixth frame segment 12*f* between gaps 11*d* and 11*f*, a seventh frame segment 12*g* between gaps 11*f* and 11*e*, an eighth frame segment 12*h* between gaps 11*e* and 11*a*, and a ninth frame segment 12*i* between gaps 11*a* and 11*b*.

The first frame segment 12*a*, the third frame segment 12*c*, the fourth frame segment 12*d*, the fifth frame segment 12*e*, the sixth frame segment 12*f*, the seventh frame segment 12*g*, the eighth frame segment 12*h*, and the ninth frame segment 12*i* are each connected with a radio-frequency source S1, and the second frame segment 12*b* is not connected with any radio-frequency source S1.

That is, in this implementation, the second frame segment 12*b* is not connected with any radio-frequency source S1, and other frame segments 12 are each connected with a corresponding radio-frequency source S1 one by one.

A preset non-end part B1 of the sixth frame segment 12*f* is grounded, and the sixth frame segment 12*f* is divided into two frame sub-segments 121*f* and 122*f* The frame sub-segment 121*f* is connected with the radio-frequency source S1 and the frame sub-segment 122*f* is grounded. Each end of the preset non-end part B1 is at a position in the sixth frame segment 12*f* which is not an end of the sixth frame segment 12*f*.

A preset non-end part B0 of the second frame segment 12*b* is grounded, and a preset position between the preset part B0 and an end of the second frame segment 12*b* adjacent to the third frame segment 12*c* is grounded. Therefore, the second frame segment 12*b* has two grounding points. In other words, the second preset non-end part B0 of the second frame segment 12*b* is grounded and divides the second frame segment 12*b* into a frame sub-segment 121*b* adjacent to the first frame segment 12*a* and a frame sub-segment 122*b* adjacent to the third frame segment 12*c*, and the frame sub-segment 122*b* is ground. Each end of the preset non-end part B0 is at a position in the second frame segment 12*b* which is not an end of the second frame segment 12*b*.

Figure 2:
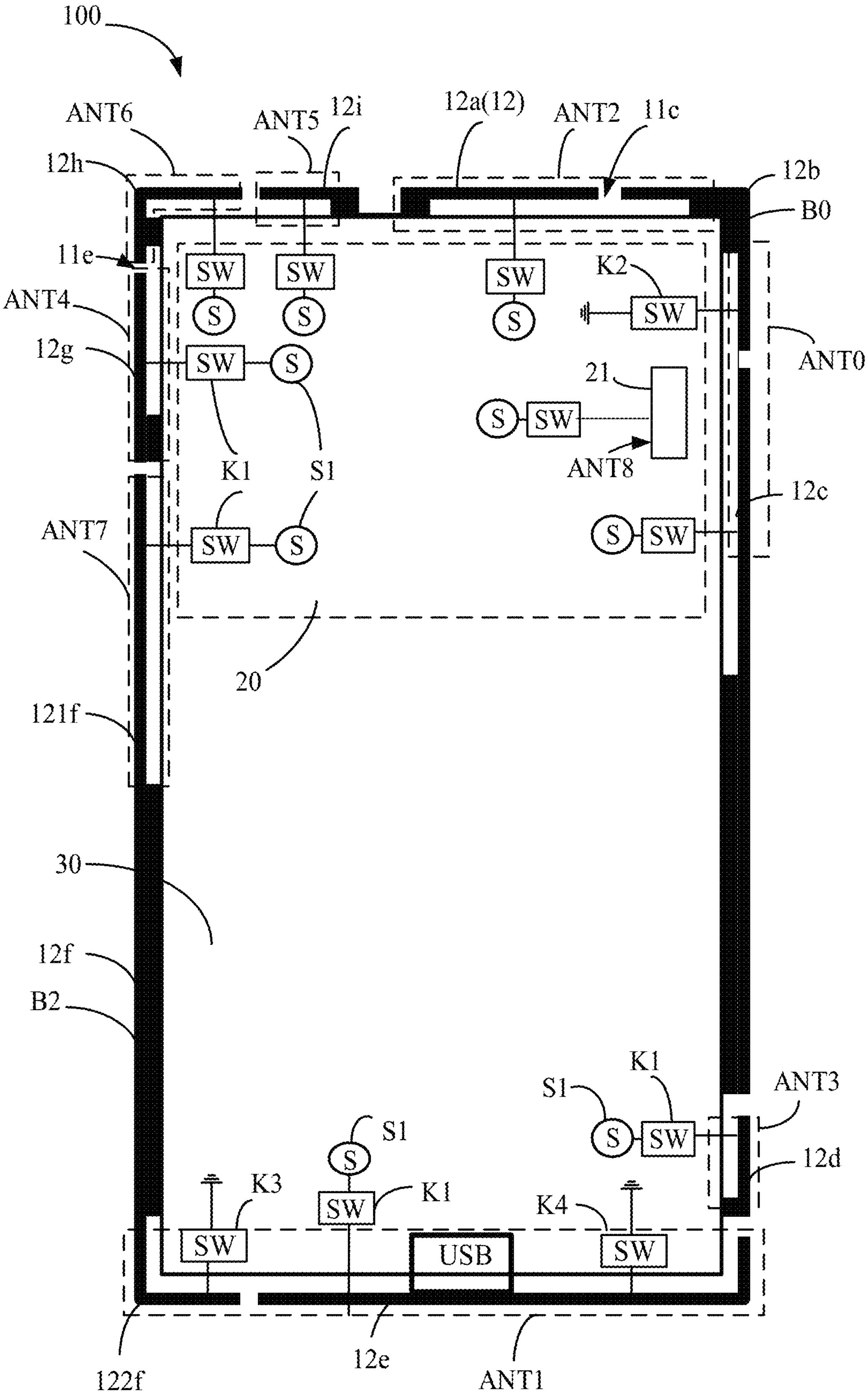
FIG. 2 is a schematic plan view of an electronic device in an implementation of the present disclosure and illustrates respective antenna bodies.

Reference is made to FIG. 2, which is a schematic plan view of an electronic device 100 in an implementation of the present disclosure and illustrates respective antenna bodies. For ease of clear illustration, FIG. 2 is simplified, and compared with FIG. 1, some components and reference numbers are omitted.

The fourth frame segment 12*d*, the seventh frame segment 12*g*, the eighth frame segment 12*h*, and the ninth frame segment 12*i* each form an antenna body. The frame sub-segment 121*f* connected with the radio-frequency source S1 forms an antenna body. The first frame segment 12*a* is coupled with the second frame segment 12*b*, and a part between the first frame segment 12*a* and the grounded preset part B0 of the second frame segment 12*b* forms an antenna body. The third frame segment 12*c* is coupled with the second frame segment 12*b*, and a part between the third frame segment 12*c* and the grounded preset part B0 of the second frame segment 12*b* forms an antenna body. The fifth frame segment 12*e* is coupled with the frame sub-segment 122*f* of the sixth frame segment 12*f*, and the fifth frame segment 12*e* and the sixth frame segment 12*f* also form an antenna body. Therefore, in this disclosure, the multiple frame segments 12 actually form eight antenna bodies.

Specifically, as illustrated in FIG. 1 and FIG. 2, the third frame segment 12*c* is coupled with the second frame segment 12*b*, and a part between the third frame segment 12*c* and the grounded preset part B0 of the second frame segment 12*b* forms a first antenna body ANT0. In other words, the third frame segment 12*c* is coupled with the frame sub-segment 122*b* of the second frame segment 12*b* to form the first antenna body ANT0. The fifth frame segment 12*e* is coupled with the frame sub-segment 122*f* of the sixth frame segment 12*f* to form a second antenna body ANT1. The first frame segment 12*a* is coupled with the second frame segment 12*b*, and a part between the first frame segment 12*a* and the grounded preset position B0 of the second frame segment 12*b* forms a third antenna body ANT2. In other words, the first frame segment 12*a* is coupled with the frame sub-segment 121*b* of the second frame segment 12*b* to form the third antenna body ANT2. The fourth frame segment 12*d* forms a fourth antenna body ANT3, the seventh frame segment 12*g* forms a fifth antenna body ANT4, the ninth frame segment 12*i* forms a sixth antenna body ANT5, the eighth frame segment 12*h* forms a seventh antenna body ANT6, and the frame sub-segment 121*f* connected with the radio-frequency source S1 forms an eighth antenna body ANT1.

Nine antenna bodies are formed by the metal frame 10 and the antenna body 21 on the main board, including the antenna body 21 on the main board 20 as described above, in this disclosure. That is, the antenna body 21 on the main board 20 forms a ninth antenna body ANT8, and nine antenna bodies ANT0 to ANT8 are actually formed in this disclosure.

When the part between the third frame segment 12*c* and the grounded preset part B0 of the second frame segment 12*b* forms the first antenna body ANT0, a part between the grounded preset part B0 of the second frame segment 12*b* and an end adjacent to the third frame segment 12*c* is served as a parasitic antenna body of the third frame segment 12*c*, thus increasing frequency bands of the antenna and supporting a frequency band supported by the first antenna body ANT0. When the part between the first frame segment 12*a* and the grounded preset part B0 of the second frame segment 12*b* forms the third antenna body ANT2, a part between the grounded preset part B0 of the second frame segment 12*b* and an end adjacent to the first frame segment 12*a* is served as a reinforced antenna body of the first frame segment 12*a*, thus improving the antenna performance and forming the third antenna body ANT2 with strong signal quality. When the fifth frame segment 12*e* is coupled with the frame sub-segment 122*f* of the sixth frame segment 12*f* to form the second antenna body, the frame sub-segment 122*f* of the sixth frame segment 12*f* is served as a reinforced antenna body of the fifth frame segment 12*e*, thus increasing the frequency bands of the antenna and supporting a frequency band supported by the second antenna body ANT1.

The frequency band supported by the first antenna body ANT0 is LMHB primary receive (PRX). In this disclosure, LMHB refers to a low-middle-high band, that is, the frequency band supported by the first antenna body ANT0 is a low-middle-high frequency band. LB diversity receive (DRX) means that the first antenna body ANT0 is a diversity antenna body in a low frequency band by default, and LMHB PRX means that the first antenna body ANT0 is a main antenna body in a low-middle-high frequency band by default.

The frequency band supported by the second antenna body ANT1 is LMHB DRX and N41 DRX MIMO, where N41 refers to a band N41 of the 5G NSA communication standard. That is, the frequency bands supported by the first antenna body ANT0 is the low-middle-high band and the band N41. The LMHB DRX means that the second antenna body ANT1 is a diversity antenna body in the low-middle-high frequency band by default, and N41 DRX MIMO means that the second antenna body ANT1 is a diversity antenna body in the band N41 by default and supports a multiple-input-multiple-output (MIMO) antenna system in the band N41.

In some implementations, the at least one frame segment 12 supporting the LMHB of the LTE among the frame segments other than the at least three frame segments 12 supporting the 5G band refers to the third frame segment 12*c* and the frame sub-segment 122*b* of the second frame segment 12*b* forming the first antenna body ANT0, and the frame segment 12 further supporting the LMHB of the LTE among the at least three frame segments 12 supporting the 5G band refers to the fifth frame segments 12*e* and the frame sub-segment 122*f* of the sixth frame segment 12*f* forming the second antenna body ANT1. As illustrated in FIG. 1, frame segments 12 forming the first antenna body ANT0 is on the second long-side 102*b*, and frame segments 12 forming the second antenna body ANT1 is on the second short-side 101*b*, that is, the frame segments 12 forming the second antenna body ANT1 and the frame segments 12 forming the first antenna body ANT0 are located on different sides of the metal frame 10.

The frequency band supported by the third antenna body ANT2 is MHB MIMO 2, N41 PRX, and N78/N79/N77 PRX MIMO. MHB refers to a middle-and-high band, and N78/N79/N77 refers to a band N78/N79/N77 of the 5G NSA communication standard, that is, the frequency band supported by the third antenna body ANT2 is the middle-and-high band, the band N41, and the band N78/N79/N77. MHB MIMO2 means that the third antenna body ANT2 supports a MIMO antenna system in the middle-and-high frequency band, and N41 PRX means that the third antenna body ANT2 is a main antenna in the band N41 by default. N78/N79/N77 PRX MIMO means that the third antenna body ANT2 is a main antenna body in the band N78/N79/N77 by default and supports the MIMO antenna system.

The frequency band supported by the fourth antenna body ANT3 is N41 DRX, that is, the frequency band supported by the fourth antenna body ANT3 is the band N41, and the fourth antenna body ANT3 is the diversity antenna in the band N41 by default.

The frequency band supported by the fifth antenna body ANT4 is MHB MIMO 3, N41 PRX MIMO, and N78/N79/N77 DRX, that is, the fifth antenna body ANT4 supports the middle-and-high band, the band N41, and the band N78/N79/N77. MHB MIMO3 means that the fifth antenna body ANT4 supports a MIMO antenna system, N41 PRX means that the fifth antenna body ANT4 is a main antenna in the band N41 by fault, and N78/N79/N77 DRX means that the fifth antenna body ANT4 is a diversity antenna in the band N78/N79/N77 by fault.

The frequency band supported by the sixth antenna body ANT5 is N78/N79/N77 PRX, that is, the frequency band supported by the sixth antenna body ANT3 is the band N78/N79/N77, and the sixth antenna body ANT5 is a main antenna body in the band N78/N79/N77 by default.

The frequency band supported by the seventh antenna body ANT6 is L1 GPS and 2.4 Ghz/5 Ghz Wi-Fi, that is, the frequency band supported by the seventh antenna body ANT6 is a L1 GPS band and a 2.4 Ghz/S Ghz Wi-Fi band.

A frequency of L1 GPS is 1575 MHz, a frequency of 2.4 Ghz Wi-Fi ranges from 2.4 to 2.484 MHz, and a frequency of 5 Ghz Wi-Fi ranges from 5.15 to 5.85 MHz.

The frequency band supported by the eighth antenna body ANT7 is L5 GPS, 5 Ghz Wi-Fi, and 2.4 Ghz Wi-Fi, that is, the frequency band supported by the eighth antenna body ANT7 is the L5 GPS band, the 2.4 Ghz Wi-Fi band, and the 5 Ghz Wi-Fi band.

The antenna body 21 located on the main board 20 forms the ninth antenna body ANT5, which supports the frequency band of N78/N79/N77 DRX MIMO, that is, a frequency band supported by the antenna body 21 located on the main board 20 is the band N78/N79/N77 of a 5G NSA communication standard, and the antenna body 21 is a diversity antenna in the band N78/N79/N77 by default and supports a MIMO antenna system in the band N78/N79/N77.

Because the band N78/N79/N77 is a high frequency band and requires relatively less antenna space, good performance of the N78/N79/N77 antenna can also be obtained by disposing the antenna body 21 on a support of the main board 20.

Therefore, multiple frequency bands including % NSA, 5G SA, Wi-Fi, GPS and 2/3/4G are realized in this disclosure through frequency bands supported by a total of nine antenna bodies.

As described above, the frequency band supported by the first antenna body ANT0 is LMHB PRX, and the frequency band supported by the second antenna body ANT1 is LMHB DRX and N41 DRX MIMO. Therefore, both the first antenna body ANT0 and the second antenna body ANT1 independently support the 2/3/4G communication standard, that is, the first antenna body ANT0 and the second antenna body ANT1 can operate independently in the 2/3/4G communication standard to realize transmission and reception of radio-frequency signals in the 2/3/4G communication standard.

As described above, the frequency bands supported by the seventh antenna body ANT6 are L1 GPS and 2.4 Ghz/5 Ghz Wi-Fi, and the frequency band supported by the eighth antenna body ANT7 is L5 GPS, 5 Ghz Wi-Fi, and 2.4 Ghz Wi-Fi, and the seventh antenna body ANT6 and the eighth antenna body ANT7 both independently support the frequency bands in GPS and Wi-Fi communication standards, that is, the seventh antenna body ANT6 and the eighth antenna body ANT7 can both independently realize transmission and reception of radio-frequency signals in GPS and Wi-Fi communication standards. 4G and LTE in this disclosure both refer to 4G LTE.

In this implementation, 5G NSA is supported by five antenna bodies, and at least one of the five antenna bodies supports both the LTE band and the 5G band. That is, an antenna architecture for 5G NSA includes the five antenna bodies described above, and the at least one of the five antenna bodies supports both the LTE band and 5G band and therefore support the frequency bands in dual communication standards.

Therefore, compared with an existing architecture in which six antennas for the 5G NSA communication standard are required, one antenna bodies can be omitted in this disclosure, which is more conducive to an overall layout of the antenna, and can also reduce the number of antennas disposed on the main board 20, thus reducing cost and improving overall performance of the antenna.

Figure 3:
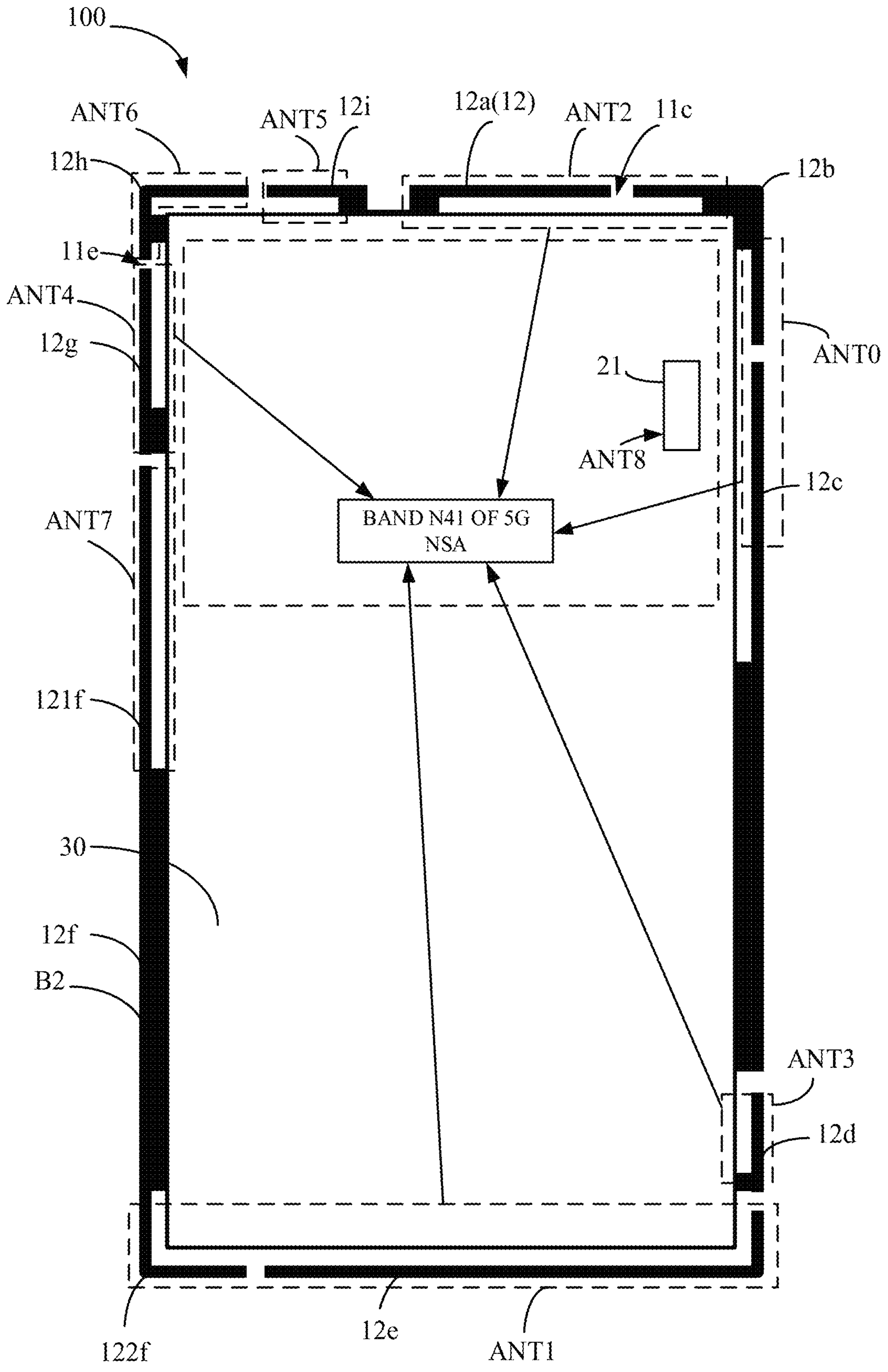
FIG. 3 is a schematic plan view of an electronic device in an implementation of the present disclosure and illustrates an antenna architecture for a band N41 of 5G NSA.

Reference is made to FIG. 3, which is a schematic plan view of an electronic device 100 in an implementation of the present disclosure and illustrates an antenna architecture for a band N41 of 5G NSA. In order to clearly illustrate the antenna architecture for the band N41 of 5G NSA, FIG. 3 is simplified with, and compared with FIG. 1, some components and reference numbers are omitted.

Specifically, the band N41 of 5G NSA is supported by the first antenna ANT0, the second antenna ANT1, the third antenna ANT2, the fourth antenna ANT3 and the fifth antenna ANT4 cooperatively. That is, the antenna architecture for the band N41 of 5G NSA includes the first antenna body ANT0, the second antenna body ANT1, the third antenna body ANT2, the fourth antenna body ANT3, and the fifth antenna body ANT4. In this implementation, the second antenna body ANT1 at least supports the frequency bands in dual communication standards of LTE and N41, and can therefore replace two existing antenna bodies. The first antenna body ANT0 supports the LTE band, and the third antenna body ANT2, the fourth antenna body ANT3, and the fifth antenna body ANT4 all support the band N41, so that two antenna bodies supporting the LTE band and four antenna bodies supporting the band N41 can be realized by these five antenna bodies, thus realizing transmission and reception of radio-frequency signals in the band N41 of 5G NSA.

The first antenna body ANT0, the second antenna body ANT1, the third antenna body ANT2, the fourth antenna body ANT3, and the fifth antenna body ANT4 are distributed on four sides of the metal frame 10, and are generally arranged along the metal frame 10 to form a 5G loop antenna.

Obviously, in other implementations, other antennas can also support the frequency bands in the dual communication standards of the LTE and the N41, as long as at least one antenna body supports the frequency bands in the dual communication standards of LET and N41.

Figure 4:
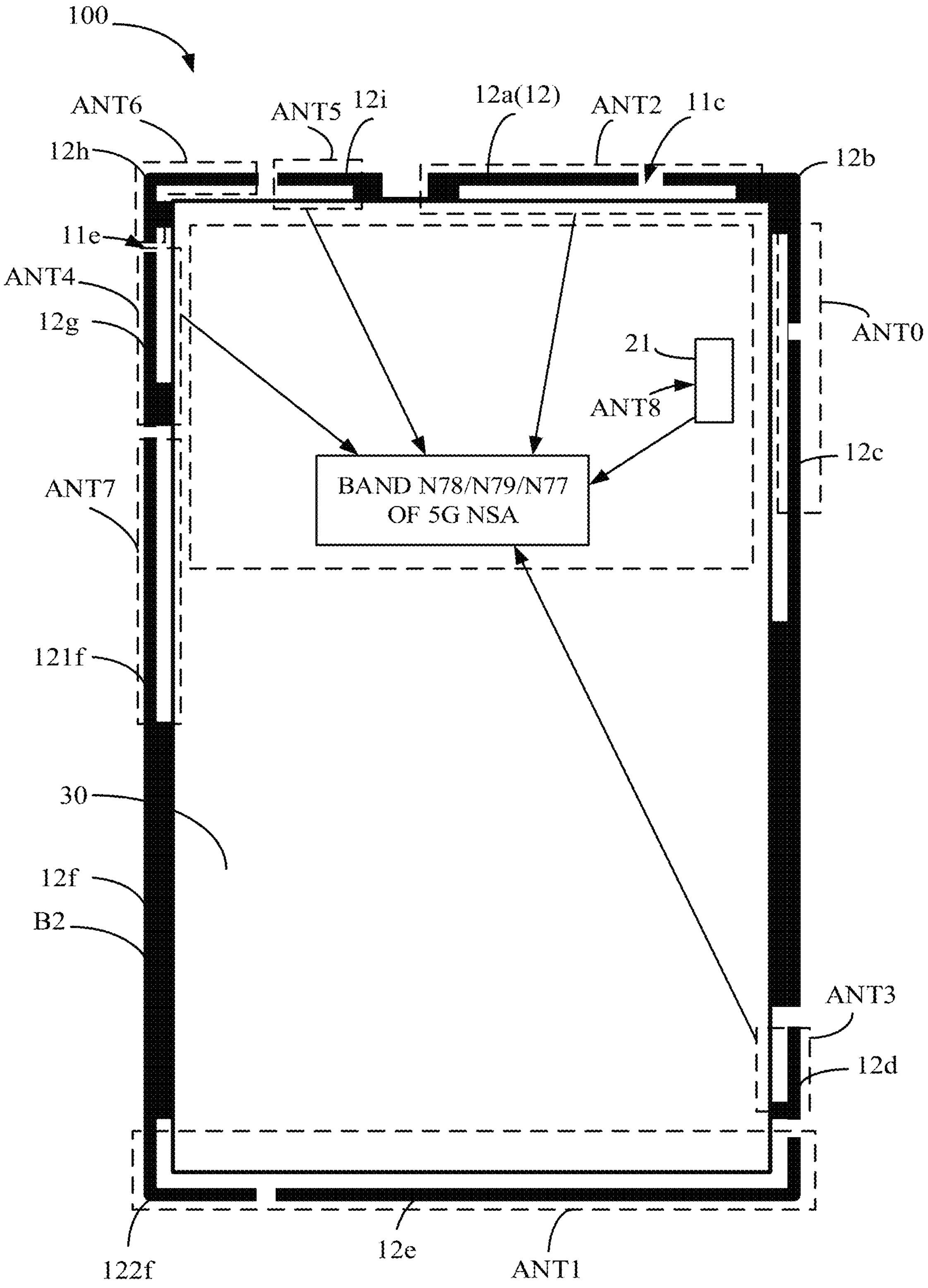
FIG. 4 is a schematic plan view of an electronic device in an implementation of the present disclosure and illustrates an antenna architecture for a band N78/N79/N77 of 5G NSA.

Reference is made to FIG. 4, which is a schematic plan view of an electronic device 100 in an implementation of the present disclosure and illustrates an antenna architecture for a band N78/N79/N77 of 5G NSA. For ease of clear illustration, FIG. 4 is also simplified, and compared with FIG. 1, some components and reference numbers are omitted.

Specifically, the band N78/N79/N77 of 5G NSA is supported by the third antenna body ANT2, the fourth antenna body ANT3, the fifth antenna body ANT4, the sixth antenna body ANT5, and the ninth antenna body ANT8 (that is, the antenna body 21 located on the main board 20) cooperatively. That is, the antenna architecture for the band N78/N79/N77 of 5G NSA includes the third antenna ANT2, the fourth antenna ANT3, the fifth antenna ANT4, the sixth antenna ANT5, and the ninth antenna ANT8. In this implementation, the frequency band supported by the third antenna body ANT2 is MHB MIMO 2, N41 PRX, and N78/N79/N77 PRX MIMO which are frequency bands in dual communication standards of the LTE and N78/N79, thereby replacing existing two antenna bodies, and the frequency band supported by the fourth antenna body ANT3 is MHB DRX and N41 MIMO2, thus supporting the LTE band. The fifth antenna body ANT4, the sixth antenna body ANT5, and the ninth antenna body ANT8 all support the band N78/N79/N77, so that two antenna bodies supporting the LTE band and four antenna bodies supporting the band N78/N79/N77 can be realized through the five antenna bodies, thus realizing transmission and reception of the radio-frequency signals in the band N78/N79/N77 of 5G NSA.

The antenna body 21 on the main board 20 is disposed close to the first short-side 101*a* and the second long-side 101*b*, and the third antenna body ANT2, the fourth antenna body ANT3, the fifth antenna body ANT4, the sixth antenna body ANT5, and the ninth antenna body ANT8 are generally arranged along the metal frame 10, thus forming a 5G loop antenna.

Figure 5:
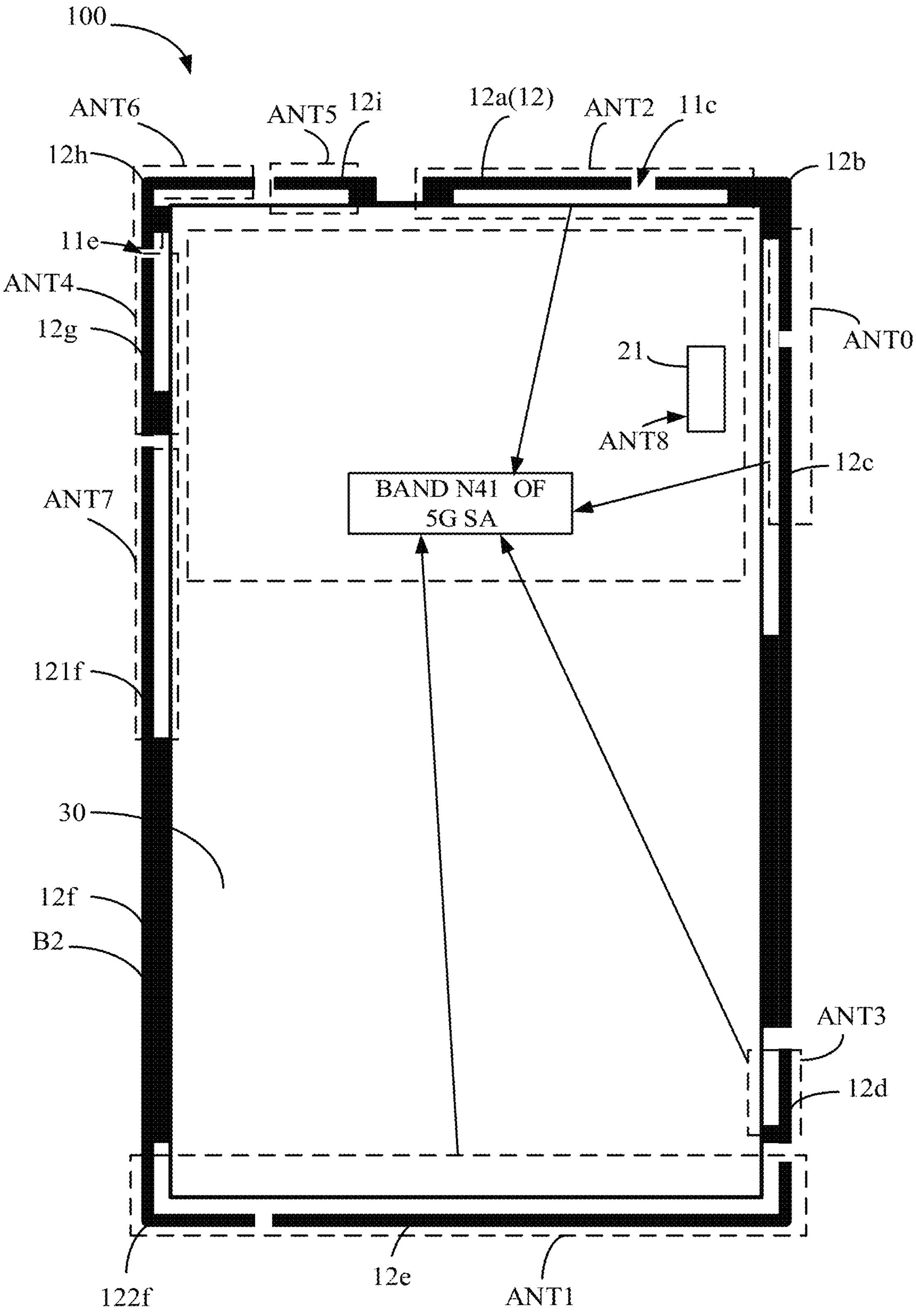
FIG. 5 is a schematic plan view of an electronic device in an implementation of the present disclosure and illustrates an antenna architecture for a band N41 of 5G SA.

Reference is made to FIG. 5, which is a schematic plan view of an electronic device 100 in an implementation of the present disclosure and illustrates an antenna architecture for a band N41 of 5G SA. For ease of clear illustration, FIG. 5 is also simplified, and compared with FIG. 1, some components and reference numbers are omitted.

As illustrated in FIG. 5, the band N41 of 5G SA in this disclosure is composed of the first antenna body ANT0, the second antenna body ANT1, the third antenna body ANT2 and the fourth antenna body ANT3. That is, an antenna architecture for the band N41 of 5G SA includes the first antenna body ANT0, the second antenna body ANT1, the third antenna body ANT2 and the fourth antenna body ANT3, and the four antenna bodies realize transmission and reception of radio-frequency signals of the band N41 of the 5G SA communication standard. The first antenna body ANT0, the second antenna body ANT1, the third antenna body ANT2, and the fourth antenna body ANT3 are substantially arranged around the metal frame 10, thus forming a wraparound 5G antenna.

Figure 6:
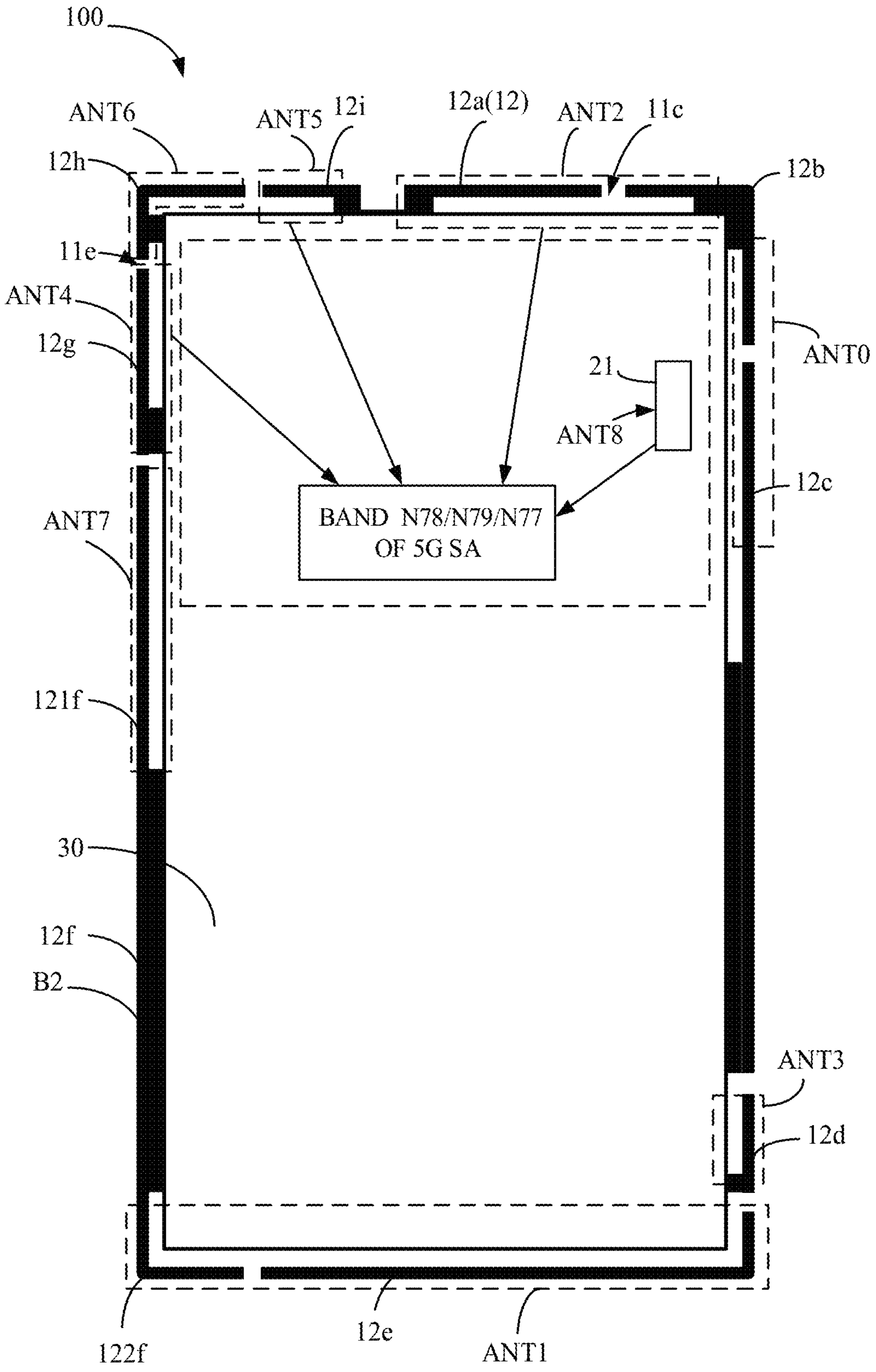
FIG. 6 is a schematic plan view of an electronic device in an implementation of the present disclosure and illustrates an antenna architecture for a band N78/N79/N77 of 5G SA.

Reference is made to FIG. 6, which is a schematic plan view of an electronic device 100 in an implementation of the present disclosure and illustrates an antenna architecture for a band N78/N79/N77 of 5G SA. For ease of clear illustration, FIG. 6 is also simplified, and compared with FIG. 1, some components and reference numbers are omitted.

As illustrated in FIG. 6, the band N78/N79/N77 of 5G SA in this disclosure is supported by the third antenna body ANT2, the fifth antenna body ANT4, the sixth antenna body ANT5, and the ninth antenna body ANT8. That is, the antenna architecture for the band N78/N79/N77 of 5G SA includes the third antenna body ANT2, the fifth antenna body ANT4, the sixth antenna body ANT5, and the ninth antenna body ANT8, and the four antenna bodies realize transmission and reception of the radio-frequency signals in the band N78/N79/N77 of the 5G SA communication standard.

The antenna body 21 on the main board 20, that is, the ninth antenna body ANT8, is disposed close to the first short-side 101*a* and the second long-side 101*b*, and the third antenna body ANT2, the fifth antenna body ANT4, the sixth antenna body ANT5 and the ninth antenna body ANT8 are generally arranged along the metal frame 10 of the electronic device 100, thus forming a 5G loop antenna.

Therefore, from the above, the frequency bands supported by the antenna apparatus 200 of this disclosure actually include multiple frequency bands of GPS, multiple frequency bands of 2.4 Ghz/5 Ghz Wi-Fi, multiple frequency bands of 2/3/4G, multiple frequency bands of N41 and N78/N79 of 5G NSA, N41 and N78/N79 of 5G SA and other communication standards.

In this disclosure, when the electronic device 100 is in a network state of the 4G communication standard, multiple antenna bodies supporting 2/3/4G can switch between a main antenna and a diversity antenna according to signal strength. When the electronic device 100 is in a network state of the 5G NSA communication standard, multiple antenna bodies supporting 5G NSA can switch between a main antenna and a diversity antenna according to signal strength.

Specifically, the multiple antenna bodies supporting 2/3/4G can switch between the main antenna and the diversity antenna according to the signal strength as follows. An antenna body with a relatively strong signal in the multiple antenna bodies supporting 2/3/4G is switched to as the main antenna and an antenna body with a relatively weak signal in the multiple antenna bodies supporting 2/3/4G is switched to as the diversity antenna. Similarly, the multiple antenna bodies supporting 5G NSA can switch between the main antenna and the diversity antenna according to signal strength as follows. An antenna body with a relatively strong signal in the multiple antenna bodies supporting 5G NSA is switched to as the main antenna and an antenna body of the multiple antenna bodies supporting 5G NSA with a relatively weak signal is switched to as the diversity antenna.

Figure 7:
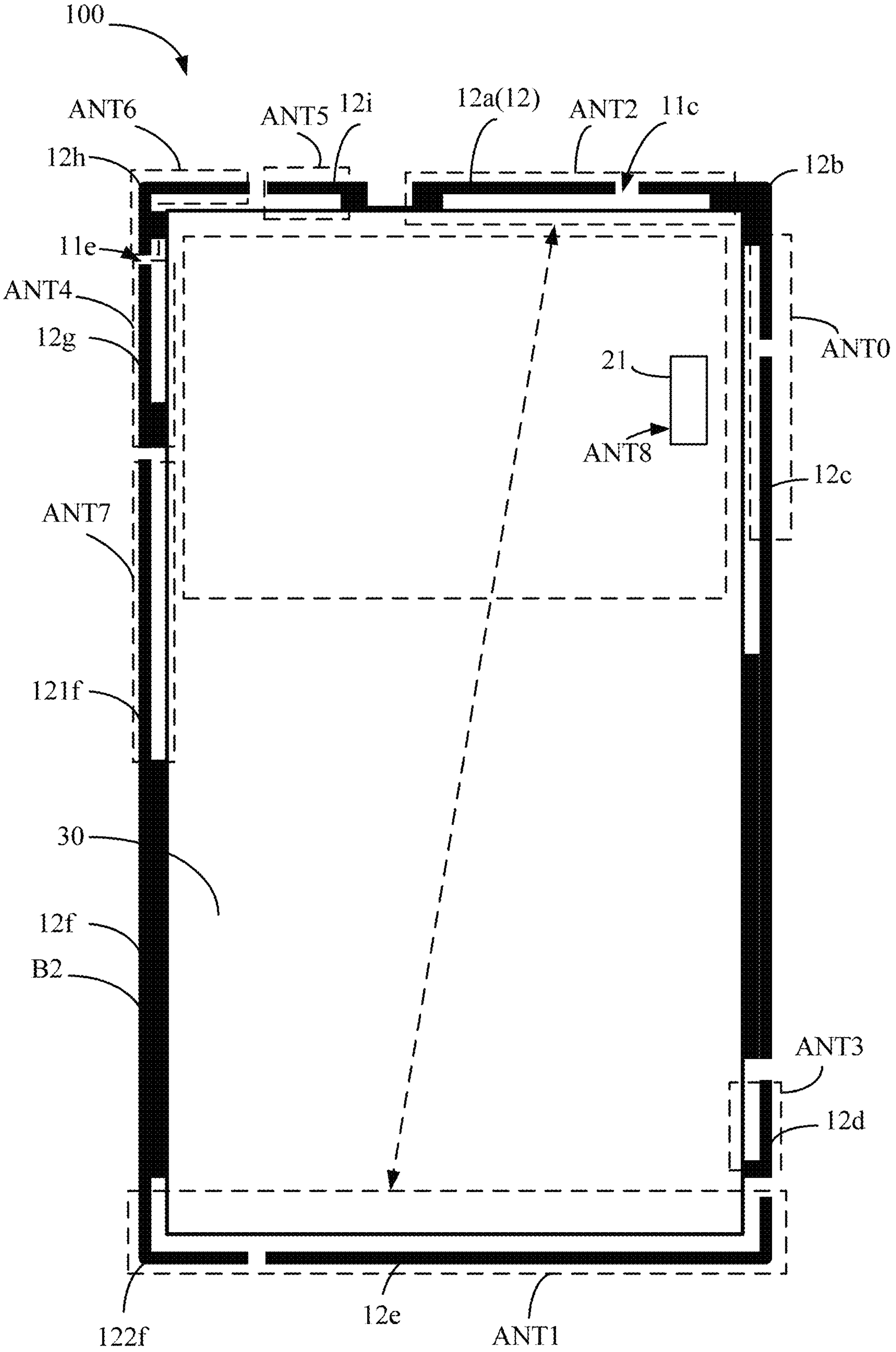
FIG. 7 is a schematic diagram illustrating switching among antenna bodies supporting 2/3/4G in an electronic device in an implementation of the present disclosure.

Reference is made to FIG. 7, which is a schematic diagram illustrating switching among antenna bodies supporting 2/3/4G in the electronic device 100 of the present disclosure. For ease of clear illustration, FIG. 7 is also simplified, and compared with FIG. 1, some components and reference numbers are omitted.

As described above, the frequency band supported by the first antenna body ANT0 is LMHB PRX, and the frequency band supported by the second antenna body ANT1 is LMHB DRX and N41 DRX MIMO. Therefore, both the first antenna body ANT0 and the second antenna body ANT1 independently support the 2/3/4G communication standard.

Therefore, when the electronic device 100 is in the network state of the 4G communication standard, the first antenna body ANT0 and the second antenna body ANT1 form an antenna pair, and can switch between the main antenna and the diversity antenna according to signal strength.

As illustrated in FIGS. 1 and 7, since the first antenna body ANT0 is on the second long-side 102*b* and the second antenna body ANT1 is on the second short-side 101*b*, no matter whether the user holds the electronic device 100 horizontally or vertically, at least one of the first antenna body ANT0 and the second antenna body ANT1 is not held by the user, and therefore signal quality can be good. At this time, the main antenna and the diversity antenna are switched according to the signal strength, and signal quality of a 2/3/4G LB can be guaranteed regardless of whether the user holds the electronic device 100 horizontally or vertically.

Reference is made to FIG. 8, which is a schematic diagram illustrating switching among antenna bodies supporting N41 in the electronic device 100 of the present disclosure. For ease of clear illustration, FIG. 8 is also simplified, and compared with FIG. 1, some components and reference numbers are omitted.

As described above, the frequency band supported by the third antenna body ANT2 is MHB MIMO 2, N41 PRX, and N78/N79/N77 PRX MIMO, and the frequency band supported by the fourth antenna body ANT3 is N41 DRX.

Therefore, both the third antenna body ANT2 and the fourth antenna body ANT3 support the band N41. When the electronic device 100 is in a network state of the 5G NSA or 5G SA communication standard, the third antenna body ANT2 and the fourth antenna body ANT3 form an antenna pair for the band N41, and the main antenna and the diversity antenna can be switched according to the signal strength.

As illustrated in FIGS. 1 and 8, since the third antenna body ANT2 is on the first short-side 101*a* and the fourth antenna body ANT3 is on the second long-side 102*b*, no matter whether the user holds electronic device 100 horizontally or vertically, at least one of the third antenna body ANT2 and the fourth antenna body ANT3 is not held by the user, and therefore signal quality can be good. At this time, for the band N41, the third antenna body ANT2 and the fourth antenna body ANT3 switch between the main antenna and the diversity antenna according to the signal strength, so as to ensure the signal quality of the band N41 of the 5G NSA communication standard.

Figure 9:
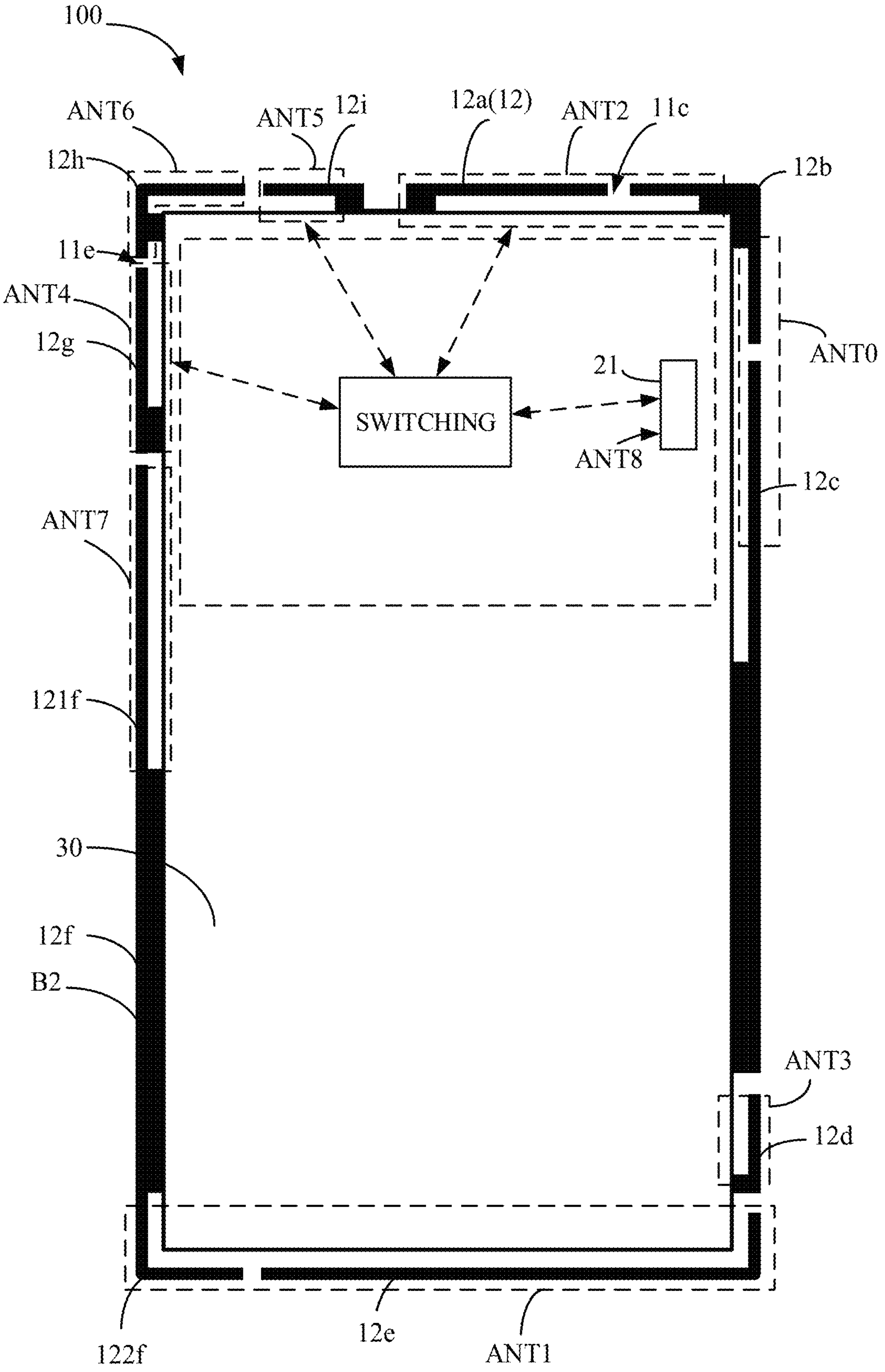
FIG. 9 is a schematic diagram illustrating switching among antenna bodies supporting 5G band N78/N79/N77 in an electronic device in an implementation of the present disclosure.

Reference is made to FIG. 9, which is a schematic diagram illustrating among antenna bodies supporting the 5G band N78/N79/N77 in the electronic device 100 of the present disclosure. For ease of clear illustration, FIG. 9 is also simplified, and compared with FIG. 1, some components and reference numbers are omitted.

As described above, the third antenna body ANT2, the fifth antenna body ANT4, the sixth antenna body ANT5, and the ninth antenna body ANT8 all support the band N78/N79/N77. When the electronic device 100 is in the network state of the 5G NSA or 5G SA communication standard, the third antenna body ANT2, the fifth antenna body ANT4, the sixth antenna body ANT5 and the ninth antenna body ANT8 form an antenna pair/group for the band N78/N79/N77, and the main antenna and the diversity antenna can be switched according to the signal strength.

Similarly, at least one of the third antenna body ANT2, the fifth antenna body ANT4, and the sixth antenna body ANT5 is not held by the user regardless of whether the user holds electronic device 100 horizontally or vertically and therefore signal quality can be good. At this time, for the band N78/N79/N77, the third antenna body ANT2, the fifth antenna body ANT4, and the sixth antenna body ANT5 switch between the main antenna and the diversity antenna according to the signal strength so as to ensure signal quality of the band N78/N79/N77 of the 5G NSA communication standard.

For an antenna group composed of more than two antenna bodies, an antenna body with a strongest signal can be selected as the main antenna, and other antenna bodies can be served as the diversity antenna. For example, among the third antenna body ANT2, the fifth antenna body ANT4, the sixth antenna body ANT5, and the ninth antenna body ANT8, when signal strength of the third antenna body ANT2 is the strongest, the third antenna body ANT2 can be selected as the main antenna, and the other antenna bodies are diversity antennas.

The band N41 ranges from 2.5 to 2.69 GHz, the band N78 ranges from 3.3 to 3.8 GHz, and the N79 band ranges from 4.8 to 5 GHz.

Figure 10:
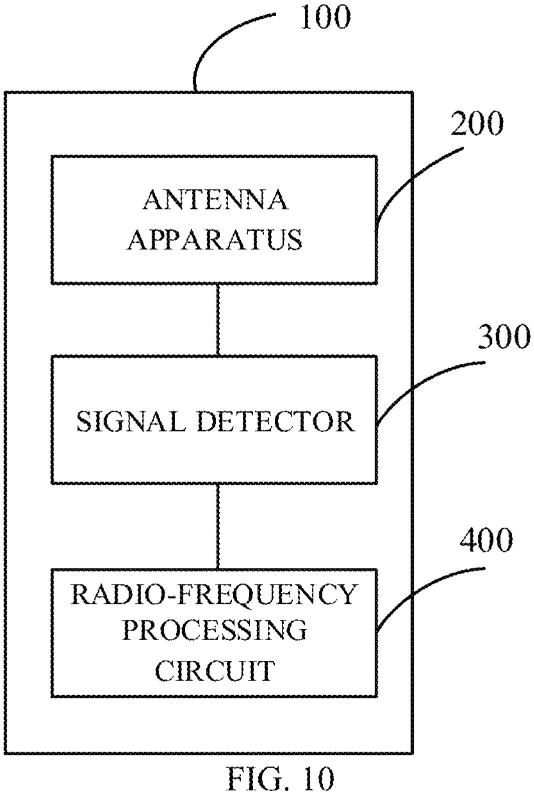
FIG. 10 is a structural block diagram of some components of an electronic device in an implementation of the present disclosure.

Reference is made to FIG. 10, which is a structural block diagram of some components of the electronic device 100. The electronic device 100 includes an antenna apparatus 200, and further includes a signal detector 300 and a radio-frequency processing circuit 400. The signal detector 300 is used for detecting signal strength of each pair of antenna bodies which can switch between the main antenna and the diversity antenna according to the signal strength. The radio-frequency processing circuit 400 is connected with the signal detector 300, and is configured to control switching of each pair of antenna bodies between the main antenna and the diversity antenna according to the signal strength detected by the signal detector 300.

Specifically, the radio-frequency processing circuit 400 determines, according to the signal strength detected by the signal detector 300, that a signal-strength difference of a certain pair of antenna bodies which can switch between the main antenna and the diversity antenna according to the signal strength exceeds a preset threshold, and when an antenna body with low signal strength is currently the main antenna, the antenna body with the low signal strength is controlled to be switched to as the diversity antenna and the antenna body with high signal strength is controlled to be switched to as the main antenna.

The preset threshold may be 6 db.

For example, for an antenna pair of the first antenna ANT0 supporting LMHB PRX frequency band and the second antenna ANT1 supporting the LMHB DRX and N41 DRX MIMO frequency bands, the radio-frequency processing circuit 400 controls the first antenna body ANT0 to be switched to as the main antenna and the second antenna body ANT1 to be switched to as the diversity antenna when signal strength of the first antenna ANT0 detected by the signal detector 300 is greater than that of the second antenna ANT1, a difference between the two signal strength exceeds the preset threshold, and the first antenna body ANT0 is a diversity antenna at this time.

The radio-frequency processing circuit 400 may include a controller, a switch, and other devices to realize the switching between the main antenna and the diversity antenna.

As illustrated in FIG. 1 and other figures, the electronic device 100 further includes a front case 30, which is configured to support a display screen and so on of the electronic device 100 and is served as a ground for the electronic device.

As illustrated in FIG. 1, the preset non-end part B1 of the sixth frame segment 12*f* has an extended part Y1, the extended part Y1 extends inward, that is, extends toward the front case 30, and the extended part Y1 is in contact with the front case 30 to be grounded.

The preset part B2 of the third frame segment 12*c* adjacent to the fourth frame segment 12*d* has an extended part Y2, the extended part Y2 extends inward, that is, toward the front case 30, and the extension Y2 is in contact with the front case 30 to be grounded.

A length of each of the preset part B1 and the extended part Y1 along a direction of the third frame segment 12*c* exceeds a preset length, and a length of each of the preset part B2 and the extended part Y2 along a direction of the fourth frame segment 12*d* also exceeds the preset length, for example, exceed ⅓ of a length of the first long-side 102*a*/the second long-side 102*b* of the metal frame 10. Therefore, the extended part Y1 of the third frame segment 12*c* and the extended part Y2 of the fourth frame segment 12*d* each are in large area contact with the front case 30, so as to support the front case 30 while grounded, thus enhancing stability of the whole structure.

As illustrated in FIG. 1, the first frame segment 12*a* forming the third antenna body ANT2 is connected with the radio-frequency source S1 at a position close to one end of the first frame segment 12*a*, and the other end of the first frame segment is grounded. The other end of the first frame segment 12*a* extends inward, that is, toward the front case 30 (a black part between the first frame segment 12*a* and the front case 30 in FIG. 1) and contacts with the front case 30 to be grounded, thus forming a complete feed circuit. Specifically, the first frame segment 12*a* is connected with the radio-frequency source S1 at one end close to the gap 11*c*, and the other end of the first frame segment 12*a* adjacent to the gap 11*b* is grounded.

The preset part B0 of the second frame segment 12*b* extends toward the front case 30 (a black part between the second frame segment 12*b* and the front case 30 in FIG. 1) and contacts with the front case 30 to be grounded.

The fourth frame segment 12*d* forming the fourth antenna body ANT3 is connected with the radio-frequency source S1 at a position close to one end of the fourth frame segment 12*d*, and the other end of the fourth frame segment is grounded. The other end of the fourth frame segment 12*d* also extends inward, that is, toward the front case 30 (a black part between the fourth frame segment 12*d* and the front case 30 in FIG. 1) and contacts with the front case 30 to be grounded, thus forming a complete feed circuit. Specifically, the fourth frame segment 12*d* is connected with the radio-frequency source S1 at a position close to one end of the fourth frame segment 12*d* adjacent to the gap 11*h*, and the other end of the fourth frame segment adjacent to the gap 11*i* is grounded.

The seventh frame segment 12*g* forming the fifth antenna body ANT4 is connected with the radio-frequency source S1 at a position close to one end of the seventh frame segment 12*g*, and the other end of the seventh frame segment is grounded. The other end of the seventh frame segment 12*g* also extends inward, that is, toward the front case 30 (a black part between the seventh frame segment 12*g* and the front case 30 in FIG. 1) and contacts with the front case 30 to be grounded, thus forming a complete feed circuit. Specifically, an end of the seventh frame segment 12*g* adjacent to the gap 11*f* is grounded, and the seventh frame segment 12*g* is connected with the radio-frequency source S1 at a non-end position.

The ninth frame segment 12*i* forming the sixth antenna body ANT5 is connected with the radio-frequency source S1 at a position close to one end of the ninth frame segment, and the other end of the ninth frame segment is grounded. The other end of the ninth frame segment 12*i* also extends inward, that is, toward the front case 30 (a black part between the ninth frame segment 12*i* and the front case 30 in FIG. 1) and contacts with the front case 30 to be grounded, thus forming a complete feed circuit. Specifically, the second frame segment 12*d* is connected with the radio-frequency source S1 at a position close to one end of the second frame segment 12*d* adjacent to the gap 11*a*, and the other end of the second frame segment adjacent to the gap 11*b* is grounded.

The eighth frame segment 12*h* forming the seventh antenna body ANT6 is connected with the radio-frequency source S1 at a position close to one end of the sixth frame segment, and the other end of the sixth frame segment is grounded. The other end of the sixth frame segment 12*f* also extends inward, that is, toward the front case 30 (a black part between the sixth frame segment 12*f* and the front case 30 in FIG. 1) and contacts with the front case 30, to be grounded, thus forming a complete feed circuit. Specifically, the sixth frame segment 12*f* is connected with the radio-frequency source S1 at a position close to one end of the sixth frame segment **12*f* adjacent to the gap 11*a*, and the other end of the sixth frame segment adjacent to the gap 11*e*** is grounded.

The eighth frame segment **12*h* is L-shaped, two segments of the sixth frame segment 12*h* are respectively part of the first short-side 101*a* and part of the first long-side 102*a* at their top corners, where the part of the first short-side 101*a* is connected with the part of the first long-side 102*a*, the radio-frequency source S1 is connected with a part of the sixth frame segment 12*h* which is served as the part of the first short-side 101*a*, and an end of the part of the sixth frame segment 12*h* which is served as the part of the first long-side 102*a*** is grounded.

That is, the first frame segment **12*a*, the fourth frame segment 12*d*, the seventh frame segment 12*g*, the eighth frame segment 12*h*, and the ninth frame segment 12*i* are each connected with the radio-frequency source S1 at a position close to one end of each of the first frame segment 12*a*, the fourth frame segment 12*d*, the seventh frame segment 12*g*, the eighth frame segment 12*h*, and the ninth frame segment 12*i*, and the other end of each of the first frame segment 12*a*, the fourth frame segment 12*d*, the seventh frame segment 12*g*, the eighth frame segment 12*h*, and the ninth frame segment 12*i*** is grounded.

Grounding parts of the first frame segment **12*a*, the fourth frame segment 12*d*, the seventh frame segment 12*g*, the eighth frame segment 12*h*, and the ninth frame segment 12*i*, and the preset part B0 of the second frame segment 12*b* each have a certain length in a direction perpendicular to an extension direction, and can each contact with the front case 30**, thus increasing overall structural strength.

In this disclosure, as illustrated in FIG. 1, a tuning switch (SW) K1 is further connected between each of radio-frequency sources S1 and a corresponding frame segment 12, that is, each of the radio-frequency sources S1 is connected with the corresponding frame segment 12 through a frequency-modulation switch K1.

As illustrated in FIG. 1, a preset position between the preset part B0 and one end of the second frame segment **12*b* adjacent to the third frame segment 12*c* is grounded by connecting with a ground on the main board 20 through a frequency-modulation switch K2. In other words, the frame sub-segment 122*b* of the second frame segment 12*b* is grounded by connecting with a ground on the main board 20 through a frequency-modulation switch K2**.

The frame sub-segment **122*f* of the sixth frame segment 12*f* is grounded by connecting with the ground on the main board 20 through a frequency-modulation switch K3**.

A part of the fifth frame segment **12*e* between the radio-frequency source S1 and the gap 11*i* is grounded by connecting with the ground on the main board 20 through a frequency-modulation switch K4**.

Specifically, all of the radio-frequency sources S1 and all of the frequency-modulation switches K1, K2, K3, and K4 are disposed on the main board 20, and the frequency-modulation switches K2, K3 and K4 are connected with the ground on the main board 20 to be grounded. The Figures of this disclosure are only schematic diagrams. For example, the radio-frequency source S1 connected with the frame segment 12 of the second short-side **101*b* and the frequency-modulation switch K1 should be actually located on the main board 20, but are drawn outside the main board 20 for the sake of clarity. Actually, for the frame segment 12 away from the main board 20, the frame segment 12 can be electrically connected with the radio-frequency source S1 on the main board 20** through wires, domes, etc.

The ground on the main board 20 is connected with the front case 30 to form a common ground.

The frequency-modulation switches K1, K2, K3 and K4 are each a switch connected with a frequency-modulation element such as capacitors and/or inductors, and the frequency-modulation switches K1, K2, K3 and K4 are for matching, that is, served as a matching circuit.

The frequency-modulation switches K1, K2, K3 and K4 all belong to the antenna apparatus 200. That is, the antenna apparatus 200 may include the metal frame 10, the antenna bodies 21, the radio-frequency sources S1, the frequency-modulation switches K1, K2, K3, and K4, etc.

In some implementations, the electronic device 100 further includes an insulating layer covering a periphery of the metal frame 10. The insulating layer is made of an insulating material, which is configured to shield the gaps 11 of the metal frame 10 and improve appearance consistency. The insulating layer is made of an insulating material and has no influence on radiation of antenna signals. The insulating layer and the metal frame 10 together form a frame of the electronic device 100.

The electronic device 100 may further include a display screen, a glass cover plate, and other structures, which are not described and illustrated because they are unrelated to improvements in this disclosure. For example, cross-sectional views illustrated in FIG. 1 and other figures are schematic diagrams with the display screen, the glass cover plate, and other structures removed, and only structures of components related to this disclosure are illustrated.

The electronic device 100 can be a mobile phone or a tablet computer.

In the electronic device 100 and the antenna apparatus 200 provided in the disclosure, multiple frame segments of the metal frame 10 are served as antenna bodies to support frequency bands of multiple communication standards, including 5G NSA, 5G SA, Wi-Fi, GPS, 2/3/4G, etc., so that communication requirements are met, and the number of antennas inside the device can be reduced as much as possible. In addition, some of the multiple frame segments 12 are each connected with the radio-frequency source S1, and at least one frame segment 12 is not connected with any radio-frequency source S1. The frame segment 12 which is not connected with any radio-frequency source S1 is coupled with an adjacent frame segment 12 connected with the radio-frequency source S1, to be served as a reinforced antenna body or a parasitic antenna body of an antenna body formed by the frame segment connected with the radio-frequency source, which can reduce the number of radio-frequency sources, and improve the antenna performance or increase frequency bands of the antenna. In addition, compared with an existing architecture in which six antennas for the 5G NSA communication standard are required, one antenna bodies can be omitted in this disclosure, which is more conducive to an overall layout of the antenna, and can also reduce the number of antennas disposed on the main board 20, thus reducing cost and improving overall performance of the antenna.

Communications bands handled by the electronic device 100 may sometimes be referred to herein as frequency bands or simply as "bands" and may span corresponding ranges of frequencies.

In other implantations of the disclosure, an electronic device is provided, an electronic device includes a metal frame is divided into multiple separate frame segments by a plurality of gaps, and the multiple frame segments severe as antenna bodies and support frequency bands of multiple communication standards. The antenna bodies at least include a first antenna body, a second antenna body, a third antenna body, and a fourth antenna body. The first antenna body supports a LMHB of LTE. The second antenna body, the third antenna body, and the fourth antenna body each support a fifth-generation (5G) band, and the second antenna body further supports the LMHB of the LTE. The first antenna body and at least one of the second antenna body, the third antenna body, and the fourth antenna body are configured for implementing a 5G NSA communication standard. The first antenna body and the second antenna body are located at different sides of the metal frame.

Reference of the specific structure of the electronic device can be made to descriptions above, which will not be described above.

The above are implementations of the implementations of the present disclosure. It is noted that several improvements and embellishments can be made by those of ordinary skill in the art without departing from the principle of the implementations of the present disclosure, which also fall within the protection scope of the present disclosure.

What is claimed is:

1. An electronic device, comprising:

a metal frame being divided into a plurality of separate frame segments by a plurality of gaps, the plurality of frame segments severing as antenna bodies and supporting frequency bands of a plurality of communication standards, wherein among the plurality of frame segments, at least three frame segments each support a fifth-generation (5G) band, among the at least three frame segments each supporting the 5G band, at least one frame segment further supports a low-middle-high band (LMHB) of long-term evolution (LTE), and among frame segments other than the at least three frame segments each supporting the 5G band, at least one frame segment supports the LMHB of the LTE;

wherein the at least one frame segment supporting the LMHB of the LTE among the frame segments other than the at least three frame segments each supporting the 5G band and at least one of the at least three frame segments each supporting the 5G band are configured for implementing a 5G non-standalone (NSA) communication standard;

wherein the at least one frame segment supporting the LMHB of the LTE among the frame segments other than the at least three frame segments each supporting the 5G band, and the frame segment supporting the LMHB of the LTE among the at least three frame segments each supporting the 5G band are located at different sides of the metal frame; and wherein the metal frame comprises a first short-side and a second short-side opposite to the first short-side, and a first long-side and a second long-side opposite to the first long-side, wherein the first short-side defines a first gap, a second gap, and a third gap, the second short-side defines a fourth gap, the first long-side defines a fifth gap and a sixth gap, and the second long-side defines a seventh gap, an eighth gap, and a ninth gap, the metal frame is divided into nine separate frame segments by these nine gaps.

2. The electronic device according to claim 1, further comprising a plurality of radio-frequency sources, wherein some of the plurality of frame segments are each connected with a radio-frequency source, and at least one of the plurality of frame segments is not connected with any radio-frequency source and is grounded; and wherein the frame segment not connected with any radio-frequency source is coupled with an adjacent frame segment connected with the radio-frequency source, and is served as a reinforced antenna body or a parasitic antenna body of an antenna body formed by the frame segment connected with the radio-frequency source.

3. The electronic device according to claim 1, wherein at least one of the plurality of frame segments independently supports a frequency band of a communication standard, and some of the plurality of frame segments at least cooperate with other frame segments to support a frequency band of a communication standard.

4. The electronic device according to claim 3, further comprising a main board, wherein the main board is provided with an antenna body, and some of the plurality of frame segments cooperatively support a frequency band of a communication standard, or some of the plurality of frame segments cooperating with the antenna body on the main board to support a frequency band of a communication standard.

5. The electronic device according to claim 2, wherein at least one of the plurality of gaps is defined at a bottom part of the metal frame.

6. The electronic device according to claim 1, wherein the first gap defined in the first short-side is close to the first long-side and the third gap defined in the first short-side is close to the second long-side, the second gap is between the first gap and the third gap and is close to the first gap, and the fifth gap and the sixth gap defined in the first long-side are close to the first short-side, and the fifth gap is closer to the first short-side than the sixth gap;

wherein the fourth gap defined in the second short-side is close to the first long-side, the seventh gap defined in the second long-side is close to the first short-side, the eighth gap and the ninth gap defined in the second long-side are close to the second short-side, and the ninth gap is more close to the second short-side than the eighth gap.

7. The electronic device according to claim 1, wherein the nine frame segments comprise a first frame segment between the second gap and the third gap, a second frame segment between the third gap and the seventh gap, a third frame segment between the seventh gap and the eighth gap, a fourth frame segment between the eighth gap and the ninth gap, a fifth frame segment between the ninth gap and the fourth gap, a sixth frame segment between the fourth gap and the sixth gap, a seventh frame segment between the sixth gap and the fifth gap, an eighth frame segment between the fifth gap and the first gap, and a ninth frame segment between the first gap and the second gap.

8. The electronic device according to claim 7, wherein the first frame segment, the third frame segment, the fourth frame segment, the fifth frame segment, the sixth frame segment, the seventh frame segment, the eighth frame segment, and the ninth frame segment are each connected with a radio-frequency source, and the second frame segment is not connected with any radio-frequency source.

9. The electronic device according to claim 7, wherein a first preset non-end part of the sixth frame segment is grounded and divides the sixth frame segment into a first frame sub-segment and a second frame sub-segment, and wherein the first frame sub-segment is connected with a radio-frequency source and the second frame sub-segment is grounded; and a second preset non-end part of the second frame segment is grounded and divides the second frame segment into a third frame sub-segment adjacent to the first frame segment and a fourth frame sub-segment adjacent to the third frame segment, and the fourth frame sub-segment is ground.

10. The electronic device according to claim 9, wherein the third frame segment is coupled with the fourth frame sub-segment of the second frame segment to form a first antenna body;

wherein the fifth frame segment is coupled with the second frame sub-segment of the sixth frame segment to form a second antenna body;

wherein the first frame segment is coupled with the third frame sub-segment of the second frame segment to form a third antenna body;

wherein the fourth frame segment forms a fourth antenna body, the seventh frame segment forms a fifth antenna body, the ninth frame segment forms a sixth antenna body, the eighth frame segment forms a seventh antenna body, the first frame sub-segment of the sixth frame segment connected with the radio-frequency source forms the eighth antenna body, and the antenna body on the main board forms the ninth antenna body.

11. The electronic device according to claim 10, wherein the 5G NSA communication standard is supported by five antenna bodies cooperatively, and at least one of the five antenna bodies supports an LTE band and a 5G band.

12. The electronic device according to claim 10, wherein the first antenna body supports a frequency band of LMHB primary receive (PRX), the second antenna body supports a frequency band of LMHB diversity receive (DRX) and N41 DRX multiple-input-multiple-output (MIMO), the third antenna body supports a frequency band of MHB MIMO 2, N41 PRX, and N78/N79/N77 PRX MIMO, the fourth antenna body supports a frequency band of N41 DRX, the fifth antenna body supports a frequency band of MHB MIMO 3, N41 PRX MIMO, and N78/N79/N77DRX, the sixth antenna body supports a frequency band of N78/N79/N77 PRX, the seventh antenna body supports a frequency band of L1 global positioning system (GPS) and 2.4 Ghz/5 Ghz Wi-Fi, the eighth antenna body supports a frequency band of L5 GPS, 5 Ghz Wi-Fi, and 2.4 Ghz Wi-Fi, and the ninth antenna body supports a frequency band of N78/N79/N77 DRX MIMO.

13. The electronic device according to claim 12, wherein a band N41 of 5G NSA is supported by the first antenna body, the second antenna body, the third antenna body, the fourth antenna body and the fifth antenna body cooperatively, the second antenna body supports at least a frequency band of dual communication standards of the LTE and the N41, the first antenna body supports a LTE band, and the third antenna body, the fourth antenna body, and the fifth antenna each support the band N41; or wherein the band N41 of 5G SA is supported by the first antenna body, the second antenna body, the third antenna body, and the fourth antenna body.

14. The electronic device according to claim 12, wherein a band N78/N79/N77 of 5G NSA are supported by the third antenna body, the fourth antenna body, the fifth antenna body, the sixth antenna body, and the ninth antenna body; and wherein the third antenna body supports a frequency band of dual communication standards of the LTE and the N78/N79/N77, the fourth antenna body supports a LTE band, and the fifth antenna body, the sixth antenna body and the ninth antenna body all support the band N78/N79/N77; or wherein the band N78/N79/N77 of 5G SA is supported by the third antenna body, the fifth antenna body, the sixth antenna body, and the ninth antenna body.

15. The electronic device according to claim 12, wherein when the electronic device is in a network state of a 4G communication standard, a plurality of antenna bodies supporting 2/3/4G can switch between a main antenna and a diversity antenna according to signal strength, and when the electronic device is in a network state of a 5G NSA or 5G SA communication standard, a plurality of antenna bodies supporting 5G NSA or 5G SA can switch between a main antenna and a diversity antenna according to a signal strength.

16. The electronic device according to claim 10, further comprising:

a front case, wherein the front case is served as a ground for the electronic device;

a first extended part extends from the first preset non-end part of the sixth frame segment toward the front case, and the first extended part is in contact with the front case to be grounded;

a second extended part extends from a third preset part of the third frame segment adjacent to the fourth frame segment toward the front case, and the second extended part is in contact with the front case to be grounded;

a length of each of the first preset non-end part and the first extended part along a direction of the sixth frame segment exceeds a preset length, and a length of each of the third preset part and the second extended part along a direction of the third frame segment exceeds the preset length; and wherein the first extended part of the sixth frame segment and the second extended part of the third frame segment abut against the front case to be grounded and to support the front case.

17. The electronic device according to claim 10, wherein the first frame segment, the fourth frame segment, the seventh frame segment, the eighth frame segment, and the ninth frame segment are each connected with a radio-frequency source at a position close to one end of each of the first frame segment, the fourth frame segment, the seventh frame segment, the eighth frame segment, and the ninth frame segment, and the other end of each of the first frame segment, the fourth frame segment, the seventh frame segment, the eighth frame segment, and the ninth frame segment is grounded.

18. The electronic device according to claim 17, wherein the fourth frame sub-segment of the second frame segment is grounded by connecting with a ground on the main board through a first frequency-modulation switch, the second frame sub-segment of the sixth frame segment is grounded by connecting with the ground on the main board through a second frequency-modulation switch and the ground on the main board, and the fifth frame segment is grounded by connecting with the ground on the main board through a third frequency-modulation switch.

19. An electronic device, comprising:

a metal frame defining a plurality of gaps and being divided into a plurality of separate frame segments by the plurality of gaps, the plurality of frame segments severing as antenna bodies and supporting frequency bands of a plurality of communication standards;

wherein the antenna bodies at least comprise a first antenna body, a second antenna body, a third antenna body, and a fourth antenna body;

wherein the first antenna body supports a low-middle-high band (LMHB) of long-term evolution (LTE);

wherein the second antenna body, the third antenna body, and the fourth antenna body each support a fifth-generation (5G) band, and the second antenna body further supports the LMHB of the LTE;

wherein the first antenna body and at least one of the second antenna body, the third antenna body, and the fourth antenna body are configured for implementing a 5G non-standalone (NSA) communication standard;

wherein the first antenna body and the second antenna body are located at different sides of the metal frame; and wherein the metal frame comprises a first short-side and a second short-side opposite to the first short-side, and a first long-side and a second long-side opposite to the first long-side, wherein the first short-side defines a first gap, a second gap, and a third gap, the second short-side defines a fourth gap, the first long-side defines a fifth gap and a sixth gap, and the second long-side defines a seventh gap, an eighth gap, and a ninth gap, the metal frame is divided into nine separate frame segments by these nine gaps.

* * * * *